US012052544B2

(12) United States Patent
Lim et al.

(10) Patent No.: US 12,052,544 B2
(45) Date of Patent: Jul. 30, 2024

(54) APPARATUS

(71) Applicant: LG Display Co., Ltd., Seoul (KR)

(72) Inventors: Jaeyoung Lim, Paju-si (KR); SangWoo Jin, Paju-si (KR); Minjung Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 206 days.

(21) Appl. No.: 17/950,064

(22) Filed: Sep. 21, 2022

(65) Prior Publication Data

US 2023/0138723 A1 May 4, 2023

(30) Foreign Application Priority Data

Nov. 4, 2021 (KR) ........................ 10-2021-0150518

(51) Int. Cl.
*H04R 17/00* (2006.01)

(52) U.S. Cl.
CPC ......... *H04R 17/00* (2013.01); *H04R 2499/15* (2013.01)

(58) Field of Classification Search
CPC ...... H04R 17/00; H04R 2499/15; H04R 7/10; H04R 7/045; H04R 9/02; H04R 2400/11; H04R 7/04; H04R 9/06; G09F 9/30
See application file for complete search history.

(56) References Cited

U.S. PATENT DOCUMENTS

2021/0306741 A1* 9/2021 Kim ........................ H04R 1/403
2022/0070563 A1* 3/2022 Kim ........................ H04R 1/026

* cited by examiner

*Primary Examiner* — Tuan D Nguyen
(74) *Attorney, Agent, or Firm* — Morgan, Lewis & Bockius LLP

(57) ABSTRACT

An apparatus may generate a vibration or a sound to enhance a sound characteristic and/or a sound pressure level characteristic. The apparatus may include a vibration member, a vibration apparatus at a rear surface of the vibration member and configured to vibrate the vibration member, and a supporting member at a rear surface of the vibration apparatus, the supporting member including a metamaterial.

25 Claims, 10 Drawing Sheets

A-A'

APPARATUS

CROSS-REFERENCE TO RELATED APPLICATIONS

This application claims the benefit of the Korean Patent Application No. 10-2021-0150518 filed on Nov. 4, 2021, which is hereby incorporated by reference as if fully set forth herein.

BACKGROUND

Technical Field

The present disclosure relates to an apparatus.

Discussion of the Related Art

Apparatuses include a separate speaker or sound apparatus, for providing a sound. When a speaker is provided in an apparatus, a problem occurs where the design and space arrangement of the apparatus are limited due to a space occupied by the speaker.

A speaker applied to apparatuses may be, for example, an actuator including a magnet and a coil. However, when an actuator is applied to an apparatus, there is a drawback where a thickness is thick. Piezoelectric devices for implementing a thin thickness are attracting much attention.

Due to a fragile characteristic, piezoelectric devices are easily damaged due to an external impact, causing a problem where the reliability of sound reproduction is low. Also, when a speaker such as a piezoelectric device is applied to a flexible apparatus, there is a problem where damage occurs due to a fragile characteristic.

SUMMARY

Accordingly, the inventors have recognized problems described above and have performed various experiments for implementing a vibration apparatus which may enhance the quality of a sound and a sound pressure level characteristic. Through the various experiments, the inventors have invented a new vibration apparatus and an apparatus including the same, which may enhance the quality of a sound and a sound pressure level characteristic.

Accordingly, embodiments of the present disclosure are directed to an apparatus that substantially obviates one or more of the problems due to limitations and disadvantages of the related art.

An aspect of the present disclosure is to provide an apparatus which may vibrate a vibration member to generate a vibration or a sound and may enhance a sound characteristic and/or a sound pressure level characteristic.

Additional features and aspects will be set forth in the description that follows, and in part will be apparent from the description, or may be learned by practice of the inventive concepts provided herein. Other features and aspects of the inventive concepts may be realized and attained by the structures pointed out in the written description, or derivable therefrom, and the claims hereof as well as the appended drawings.

To achieve these and other aspects of the inventive concepts, as embodied and broadly described herein, an apparatus may comprise a vibration member, a vibration apparatus at a rear surface of the vibration member and configured to vibrate the vibration member, and a supporting member at a rear surface of the vibration apparatus, the supporting member including a metamaterial.

In another aspect, an apparatus may comprise a vibration member, a vibration apparatus at a rear surface of the vibration member and configured to vibrate the vibration member, a supporting member at a rear surface of the vibration apparatus, the supporting member including a metamaterial, and a connection member at the rear surface of the vibration apparatus and without overlapping a hole of the metamaterial.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects and embodiments of the disclosure and together with the description serve to explain principles of the disclosure.

Figure 1:
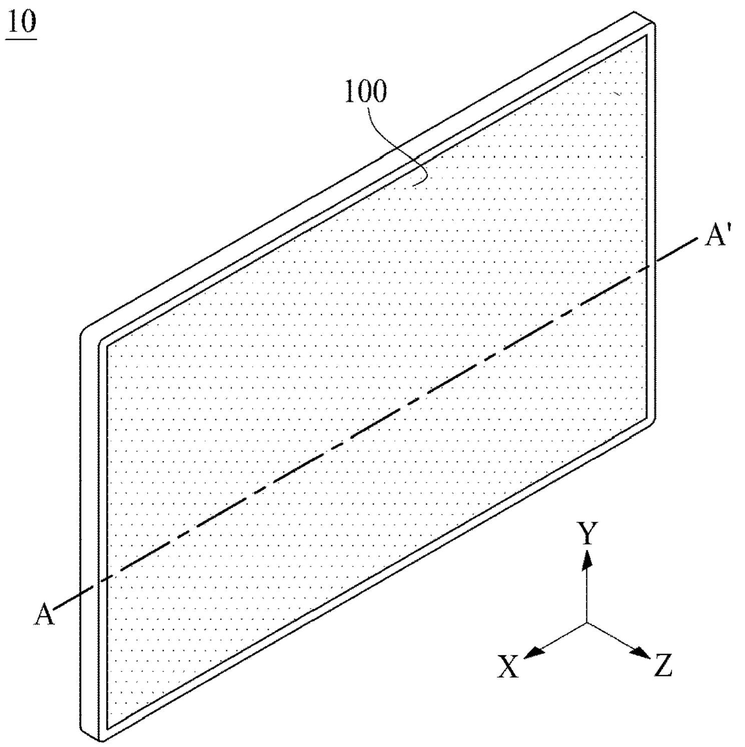
FIG. 1 illustrates an apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals refer to like elements throughout unless stated otherwise. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and completely convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, embodiments of the present disclosure are not limited to the illustrated details. Like reference numerals refer to like elements throughout the specification. In the following description, when the detailed description of the relevant known function or configuration is determined to unnecessarily obscure the important point of the present disclosure, the detailed description will be omitted.

When the terms "comprise," "have," and "include," "contain," "constitute," "make up of," "formed of," and the like are used, one or more other elements may be added unless the term, such as "only" is used. The terms of a singular form may include plural forms unless the context clearly indicates otherwise.

In construing an element, the element is construed as including an error range even where no explicit description is provided.

In describing a position relationship, for example, when the position relationship is described using "on," "over," "under," "above," "below," "beneath," "near," "close to," or "adjacent to," "beside," "next to," or the like, one or more portions may be arranged between two other portions unless a more limiting term, such as "immediate(ly)," "direct(ly)," or "close(ly)" is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which a third structure is disposed or interposed therebetween. Furthermore, the terms "front," "rear," "left," "right," "top," "bottom, "downward," "upward," "upper," "lower," and the like refer to an arbitrary frame of reference.

In describing a temporal relationship, for example, when the temporal order is described as "after," "subsequent," "next," "before," "prior to," or the like, a case which is not continuous may be included unless a more limiting term, such as "just," "immediate(ly)," or "direct(ly)" is used.

It will be understood that, although the terms "first," "second," "A," "B," "(a)," "(b)," or the like may be used herein to describe various elements, these elements should not be limited by these terms. These terms are only used to partition one element from another. For example, a first element could be termed a second element, and, similarly, a second element could be termed a first element, without departing from the scope of the present invention.

The terms "first horizontal axis direction," "second horizontal axis direction," and "vertical axis direction" should not be interpreted only based on a geometrical relationship in which the respective directions are perpendicular to each other, and may be meant as directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

Figure 2:
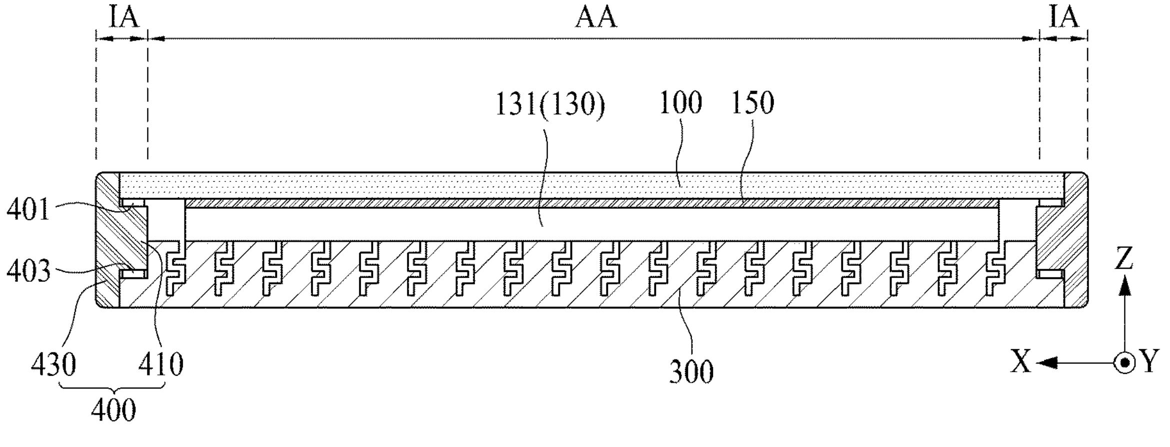
FIG. 2 is a cross-sectional view taken along line A-A' illustrated in FIG. 1.
Figure 3A:
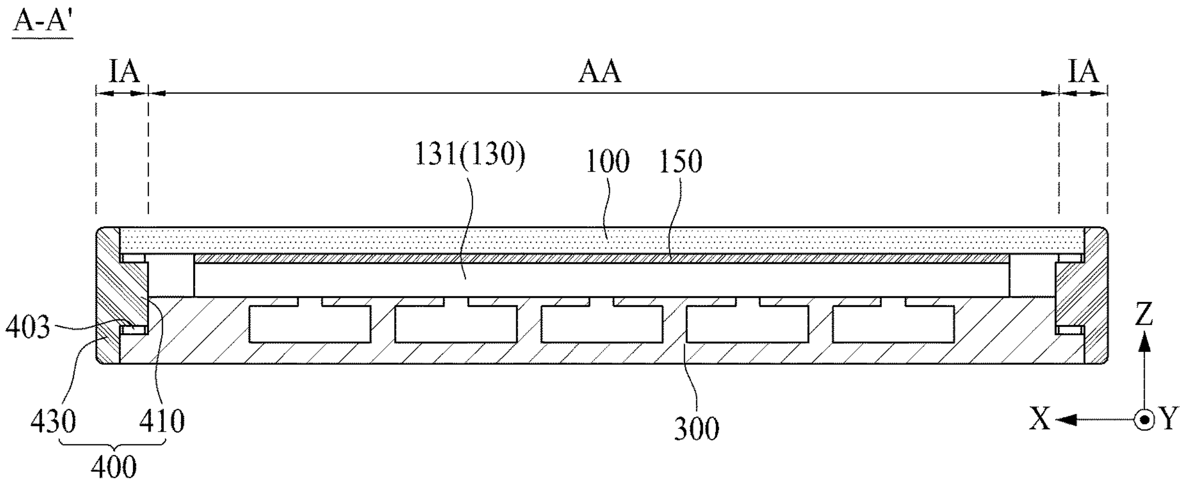
FIG. 3A is another cross-sectional view taken along line A-A' illustrated in FIG. 1.

FIG. 1 illustrates an apparatus according to an embodiment of the present disclosure. FIG. 2 is a cross-sectional view taken along line A-A' illustrated in FIG. 1. FIG. 3A is another cross-sectional view taken along line A-A' illustrated in FIG. 1, and FIG. 3B is another cross-sectional view taken along line A-A' illustrated in FIG. 1.

Figure 3B:
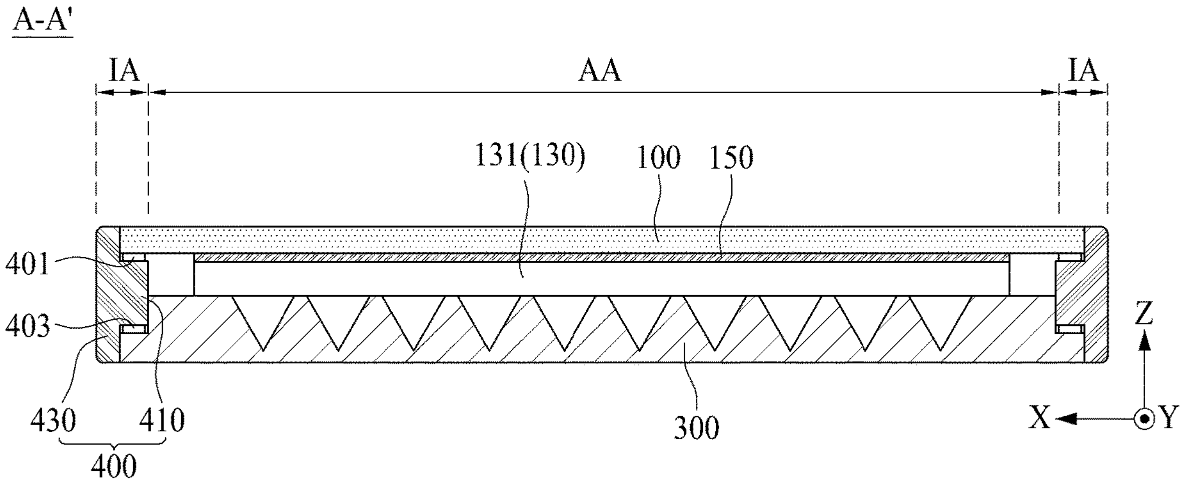
FIG. 3B is another cross-sectional view taken along line A-A' illustrated in FIG. 1.

Referring to FIGS. 1 and 3B, the apparatus 10 according to an embodiment of the present disclosure may include a vibration member 100 and a vibration apparatus 130 which is disposed at a rear surface (or a backside surface) of the vibration member 100.

For example, the vibration member 100 may output a sound based on a vibration of the vibration apparatus 130. The vibration apparatus 130 may output a sound by the vibration member 100 as a vibration plate. For example, the vibration apparatus 130 may output a sound toward a front surface of the vibration member 100 by the vibration member 100 as a vibration plate. For example, the vibration apparatus 130 may generate a sound so that the sound travels toward the front surface of the vibration member 100 or the display panel. The vibration apparatus 130 may vibrate the vibration member 100 to output a sound. For example, the vibration apparatus 130 may directly vibrate the vibration member 100 to output a sound. For example, the vibration member 100 may be a vibration object, a display panel, a vibration plate, or a front member, but embodiments of the present disclosure are not limited thereto. Hereinafter, an embodiment where a vibration member is a display panel will be described.

The apparatus 10 according to the present disclosure may include a display apparatus such as an organic light emitting display (OLED) module or a liquid crystal module (LCM) including a display panel and a driver for driving the display panel. Also, the apparatus may include a set device (or a set apparatus) or a set electronic device such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the apparatus 10 may include a display apparatus itself, such as an LCM or an OLED module, and a set device which is a final consumer device or an application product including the LCM or the OLED module.

In some embodiments, an LCM or an OLED module including a display panel and a driver may be referred to as a display apparatus, and an electronic device which is a final product including an LCM or an OLED module may be referred to as a set device. For example, the display apparatus may include a display panel, such as an LCD or an OLED, and a source printed circuit board (PCB) which is a controller for driving the display panel. The set device may further include a set PCB which is a set controller electrically connected to the source PCB to overall control the set device.

A display panel applied to an embodiment of the present disclosure may use all types of display panels such as a liquid crystal display panel, an organic light emitting diode (OLED) display panel, and an electroluminescent display panel, but is not limited to a specific display panel which is vibrated by a sound generating apparatus according to an embodiment of the present disclosure to output a sound. Also, a shape or a size of a display panel applied to a display apparatus according to an embodiment of the present disclosure is not limited.

The display panel may further include a backing such as a metal plate attached on the display panel. However, the present embodiment is not limited to the metal plate, and the display panel may include another structure (for example, another structure including another material).

The display panel 100 may display an image (for example, an electronic image, a digital image, a still image, or a video image). For example, the display panel 100 may emit light to display an image. The display panel may be a curved display panel or all types of display panels such as a liquid crystal display panel, an organic light emitting display panel, a quantum dot light emitting display panel, a micro light emitting diode display panel, and an electrophoresis display panel. For example, the display panel 100 may be a flexible light emitting display panel, a flexible electrophoresis display panel, a flexible electro-wetting display panel, a flexible micro light emitting diode display panel, or a flexible quantum dot light emitting display panel, but embodiments of the present disclosure are not limited thereto.

The display panel 100 according to an embodiment of the present disclosure may include a display area AA which displays an image based on driving of a plurality of pixels. The display panel 100 may include a non-display area IA which surrounds the display area AA, but embodiments of the present disclosure are not limited thereto.

When the display panel 100 is an organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel 100 according to an embodiment of the present disclosure may include an anode electrode, a cathode electrode, and a light emitting device and may display an image in a type such as a top emission type, a bottom emission type, or a dual emission type, based on a structure of a pixel array layer including a plurality of pixels. In the top emission type, visible light emitted from the pixel array layer may be irradiated in a forward direction of a base substrate to allow an image to be displayed, and in the bottom emission type, the visible light emitted from the pixel array layer may be irradiated in a rearward direction of the base substrate to allow an image to be displayed.

The display panel 100 according to an embodiment of the present disclosure may include a pixel array portion disposed on a substrate. The pixel array portion may include a plurality of pixels which display an image based on a signal supplied through each of signal lines. The signal lines may include a gate line, a data line, and a pixel driving power line, but embodiments of the present disclosure are not limited thereto.

Each of the plurality of pixels may include a pixel circuit layer including a driving TFT provided in a pixel area which is configured by a plurality of gate lines and/or a plurality of data lines, an anode electrode electrically connected to the driving TFT, a light emitting device formed on the anode electrode, and a cathode electrode electrically connected to the light emitting device.

The driving TFT may be provided in a transistor region of each pixel area provided in a substrate. The driving TFT may include a gate electrode, a gate insulation layer, a semiconductor layer, a source electrode, and a drain electrode. The semiconductor layer of the driving TFT may include silicon such as amorphous silicon (a-Si), polysilicon (poly-Si), or low temperature poly-Si or may include oxide such as indium-gallium-zinc-oxide (IGZO), but embodiments of the present disclosure are not limited thereto.

The anode electrode (or a pixel electrode) may be provided in an opening region provided in each pixel area and may be electrically connected to the driving TFT.

The light emitting device according to an embodiment of the present disclosure may include an organic light emitting device layer provided on the anode electrode. The organic light emitting device layer may be implemented so that pixels emit light of the same color (for example, white light) or emit lights of different colors (for example, red light, green light, and blue light). The cathode electrode (or a common electrode) may be connected to the organic light emitting device layer provided in each pixel area. For example, the organic light emitting device layer may have a stack structure including two or more structures or a single structure including the same color. In another embodiment of the present disclosure, the organic light emitting device layer may have a stack structure including two or more structures including one or more different colors for each pixel. Two or more structures including one or more different colors may be configured in one or more of blue, red, yellow-green, and green, or a combination thereof, but embodiments of the present disclosure are not limited thereto. An example of the combination may include blue and red, red and yellow-green, red and green, and red/yellow-green/green, but embodiments of the present disclosure are not limited thereto. Also, regardless of a stack order thereof, the combination may be applied. A stack structure including two or more structures having the same color or one or more different colors may further include a charge generating layer between two or more structures. The charge generating layer may have a PN junction structure and may include an N-type charge generating layer and a P-type charge generating layer.

According to another embodiment of the present disclosure, the light emitting device may include a micro light emitting diode device which is electrically connected to each of the anode electrode and the cathode electrode. The micro light emitting diode device may be a light emitting diode implemented as an integrated circuit (IC) type or a chip type. The micro light emitting diode device may include a first terminal electrically connected to the anode electrode and a second terminal electrically connected to the cathode electrode. The cathode electrode may be connected to the second terminal of the micro light emitting diode device provided in each pixel area.

An encapsulation portion may be formed on the substrate to surround the pixel array portion, and thus, may prevent oxygen or water from penetrating into the light emitting device layer of the pixel array portion. The encapsulation portion according to an embodiment of the present disclosure may be formed in a multi-layer structure where an organic material layer and an inorganic material layer are alternately stacked, but embodiments of the present disclosure are not limited thereto. The inorganic material layer may prevent oxygen or water from penetrating into the light emitting device layer of the pixel array portion. The organic material layer may be formed to have a thickness which is relatively thicker than that of the inorganic material layer, so as to cover particles occurring in a manufacturing process. For example, the encapsulation portion may include a first inorganic layer, an organic layer on the first inorganic layer, and a second inorganic layer on the organic layer. The organic layer may be a particle covering layer, but the terms are not limited thereto. A touch panel may be disposed on the encapsulation portion, or may be disposed on a rear surface of the pixel array portion or in the pixel array portion.

A display panel 100 according to an embodiment of the present disclosure may include a first substrate, a second substrate, and a liquid crystal layer. The first substrate may be an upper substrate or a thin film transistor (TFT) array substrate. For example, the display panel 100 may include the first substrate including a TFT which is a switching element for adjusting a light transmittance of each pixel, the second substrate including a color filter and/or a black matrix, and the liquid crystal layer which is formed between the first substrate and the second substrate. For example, the first substrate may include a pixel array (or a display portion or a display area) including a plurality of pixels arranged in a plurality of pixel areas defined by a plurality of gate lines and/or a plurality of data lines. Each of the plurality of pixels may include a TFT connected to a gate line and/or a data line, a pixel electrode connected to the TFT, and a common electrode which is formed to be adjacent to the pixel electrode and is supplied with a common voltage.

The first substrate may further include a pad portion provided at a first edge (or a non-display portion or a first periphery) thereof and a gate driving circuit provided at a second edge (or a second non-display portion or a second periphery) thereof.

The pad portion may supply the pixel array portion and/or the gate driving circuit with a signal supplied from the outside. For example, the pad portion may include a plurality of data pads connected to the plurality of data lines through a plurality of data link lines and/or a plurality of gate input pads connected to the gate driving circuit through a gate control signal line. For example, a size of the first substrate may be greater than that of the second substrate, but the terms are not limited thereto.

The gate driving circuit may be embedded (or integrated) into the second edge (or the second periphery) of the first substrate so as to be connected to the plurality of gate lines. For example, the gate driving circuit may be implemented with a shift register including a transistor formed by the same process as a TFT provided in the pixel area. According to another embodiment of the present disclosure, the gate driving circuit may not be embedded into the first substrate and may be provided in a panel driving circuit in an IC type.

The second substrate may be a lower substrate or a color filter array substrate. For example, the second substrate may include a pixel pattern (or a pixel definition pattern) capable of including an opening region overlapping the pixel area formed in the first substrate and a color filter layer formed in the opening region. The second substrate may have a size which is less than that of the first substrate, but embodiments of the present disclosure are not limited thereto. The second substrate may overlap the other portion, except the first edge (or the first periphery), of the first substrate. The second substrate may be bonded to the other portion, except the first edge (or the first periphery), of the first substrate by a sealant with the liquid crystal layer therebetween.

The liquid crystal layer may be disposed between the first substrate and the second substrate. The liquid crystal layer may include liquid crystal where an alignment direction of liquid crystal molecules is changed based on an electrical field generated by the common voltage and a data voltage applied to the pixel electrode for each pixel.

A second polarization member may be attached on a bottom surface of the second substrate and may polarize light which is incident from a backlight and travels to the liquid crystal layer. The first polarization member may be attached on a top surface of the first substrate and may polarize light which passes through the first substrate and is discharged to the outside.

The display panel 100 according to an embodiment of the present disclosure may drive the liquid crystal layer with the electrical field which is generated by the common voltage and the data voltage applied to each pixel, thereby displaying an image based on light passing through the liquid crystal layer.

In the display panel 100 according to another embodiment of the present disclosure, the first substrate may be a color filter array substrate, and the second substrate may be a TFT array substrate. For example, the display panel 100 according to another embodiment of the present disclosure may have a form where the display panel 100 according to an embodiment of the present disclosure is vertically reversed. In this case, a pad portion of the display panel 100 according to another embodiment of the present disclosure may be covered by a separate mechanism.

The display panel 100 according to another embodiment of the present disclosure may include a bending portion which is bent or curved to have a certain curvature radius or a curved shape.

The bending portion of the display panel 100 may be implemented at one or more of one edge portion (or one periphery portion) and the other edge portion (or the other periphery portion) of the display panel 100 parallel to each other. The one edge portion and the other edge portion (or the other periphery portion) of the display panel 100 implementing the bending portion may include only the non-display area IA, or may include an edge portion (or a periphery portion) of the display area AA and the non-display area IA. The display panel 100 including a bending portion implemented by bending of the non-display area IA may have a one-side bezel bending structure or a both-side bezel bending structure. Also, the display panel 100 including the edge portion (or the periphery portion) of the display area AA and the bending portion implemented by bending of the non-display area IA may have a one-side active bending structure or a both-side active bending structure.

The vibration apparatus 130 may vibrate the display panel 100 at the rear surface of the display panel 100, and thus, may provide a user with a sound and/or a haptic feedback based on a vibration of the display panel 100. The vibration apparatus 130 may be implemented on a rear surface of the display panel 100 to directly vibrate the display panel 100. For example, the vibration apparatus 130 may be a vibration generating apparatus, a displacement apparatus, a sound apparatus, or a sound generating apparatus, but the terms are not limited thereto.

In an embodiment of the present disclosure, the vibration apparatus 130 may vibrate based on a vibration driving signal synchronized with an image displayed by the display panel 100, thereby vibrating the display panel 100. According to another embodiment of the present disclosure, the vibration apparatus 130 may vibrate based on a haptic feedback signal (or a tactile feedback signal) synchronized with a user touch applied to a touch panel (or a touch sensor layer) which is disposed on the display panel 100 or embedded into the display panel 100, and thus, may vibrate the display panel 100. Accordingly, the display panel 100 may vibrate based on a vibration of the vibration apparatus 130 to provide a user (or a viewer) with one or more of a sound and a haptic feedback.

The vibration apparatus 130 may vibrate the display panel or the vibration member 100. For example, the vibration apparatus 130 may be implemented on the rear surface of the vibration member 100 to directly vibrate the display panel or the vibration member 100. For example, the vibration apparatus 130 may vibrate the vibration member 100 at the rear surface of the display panel or the vibration member 100, and thus, may provide a user (or a viewer) with a sound and a haptic feedback based on a vibration of the display panel or the vibration member 100.

The vibration apparatus 130 according to an embodiment of the present disclosure may be implemented to have a size corresponding to the display area AA of the display panel 100. A size of the vibration apparatus 130 may be 0.9 to 1.1 times a size of the display area AA, but embodiments of the present disclosure are not limited thereto. For example, a size of the vibration apparatus 130 may be the same as or smaller than the size of the display area AA. For example, a size of the vibration apparatus 130 may be the same as or approximately same as the display area AA of the display panel 100, and thus, the vibration apparatus 130 may cover a most region of the display panel 100 and a vibration generated by the vibration apparatus 130 may vibrate a whole portion of the display panel 100, and thus, localization of a sound may be high, and satisfaction of a user may be improved. Also, a contact area (or panel coverage) between the display panel 100 and the vibration apparatus 130 may increase, and thus, a vibration region of the display panel 100 may increase, thereby improving a sound of a middle-low-pitched sound band generated based on a vibration of the display panel 100. Also, a vibration apparatus 130 applied to a large-sized display apparatus may vibrate the entire display panel 100 having a large size (or a large area), and thus, localization of a sound based on a vibration of the display panel 100 may be further enhanced, thereby realizing an improved sound effect. Therefore, the vibration apparatus 130 according to an embodiment of the present disclosure may be on the rear surface of the display panel 100 to sufficiently vibrate the display panel 100 in a vertical (or front-to-rear) direction, thereby outputting a desired sound to a forward region in front of the apparatus or the display apparatus. For example, the vibration apparatus 130 according to an embodiment of the present disclosure may be disposed at the rear surface of the display panel 100 to sufficiently vibrate the display panel 100 in a vertical (or front-to-rear) direction with respect to a first direction (X) of the display panel 100, thereby outputting a desired sound to a forward region in front of the apparatus or the display apparatus.

The vibration apparatus 130 according to an embodiment of the present disclosure may be implemented as a film type. Because the vibration apparatus 130 is implemented as a film type, the vibration apparatus 130 may have a thickness which is thinner than the display panel 100, thereby minimizing an increase in thickness of the apparatus caused by the arrangement of the vibration apparatus 130. For example, the vibration apparatus 130 may be referred to as a sound generating module, a sound generating apparatus, a vibration generating apparatus, a displacement apparatus, a sound apparatus, a film actuator, a film type piezoelectric composite actuator, a film speaker, a film type piezoelectric speaker, or a film type piezoelectric composite speaker, which uses a vibration member or the display panel 100 as a vibration plate or a sound vibration plate, but the terms are not limited thereto.

The vibration apparatus 130 or a vibration device 131 according to an embodiment of the present disclosure may include a ceramic-based material for generating a relatively high vibration, or may include a piezoelectric ceramic having a perovskite-based crystalline structure. The perovskite crystalline structure may have a piezoelectric effect and/or an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "O" may be anions. For example, the first portions 51*a* may include one or more of lead(II) titanate ($PbTiO_3$), lead zirconate ($PbZrO_3$), lead zirconate titanate($PbZrTiO_3$), barium titanate ($BaTiO_3$), and strontium titanate ($SrTiO_3$), but embodiments of the present disclosure are not limited thereto.

In a perovskite crystalline structure, a position of a center ion may be changed by an external stress or a magnetic field to vary polarization, and a piezoelectric effect may be generated based on the variation of the polarization. In a perovskite crystalline structure including $PbTiO_3$, a position of a Ti ion corresponding to a center ion may be changed to vary polarization, and thus, a piezoelectric effect may be generated. For example, in the perovskite crystalline structure, a cubic shape having a symmetric structure may be changed to a tetragonal shape, an orthorhombic shape, and a rhombohedral shape each having an unsymmetric structure by an external stress or a magnetic field, and thus, a piezoelectric effect may be generated. Polarization may be high at a morphotropic phase boundary (MPB) of a tetragonal structure and a rhombohedral structure, and polarization may be easily realigned, thereby obtaining a high piezoelectric characteristic.

According to an embodiment of the present disclosure, the vibration apparatus 130 or the vibration device 131 may include one or more materials among lead (Pb), zirconium (Zr), titanium (Ti), zinc (Zn), nickel (Ni), and niobium (Nb), but embodiments of the present disclosure are not limited thereto.

The vibration apparatus 130 or the vibration device 131 according to another embodiment of the present disclosure may include single crystalline ceramic and/or polycrystalline ceramic. The single crystalline ceramic may be a material where particles having a single crystal domain having a certain structure are regularly arranged. The polycrystalline ceramic may include irregular particles where various crystal domains are provided.

According to another embodiment of the present disclosure, the vibration apparatus 130 or the vibration device 131 may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. According to another embodiment of the present disclosure, the vibration apparatus 130 or the vibration device 131 may include one or more of calcium titanate ($CaTiO_3$), $BaTiO_3$, and $SrTiO_3$, each including no Pb, but embodiments of the present disclosure are not limited thereto.

According to another embodiment of the present disclosure, the vibration apparatus 130 or the vibration device 131 may have a piezoelectric deformation coefficient "$d_{33}$" of 1,000 pC/N or more in the thickness direction Z. By having a high piezoelectric deformation coefficient "$d_{33}$", it is possible to provide the vibrating apparatus that may be applied to a display panel or a vibration member (or a vibration object) having a large size or may have a sufficient vibration characteristic or piezoelectric characteristic. For example, in order to have a high piezoelectric deformation coefficient "$d_{33}$", the inorganic material portion may include a PZT-based material ($PbZrTiO_3$) as a main component and may include a softener dopant material doped into A site (Pb) and a relaxor ferroelectric material doped into B site (ZrTi).

The softener dopant material may enhance a piezoelectric characteristic and a dielectric characteristic of the vibration apparatus 130 or the vibration device 131. For example, the softener dopant material may increase the piezoelectric deformation coefficient "$d_{33}$" of the inorganic material portion. The softener dopant material according to an embodiment of the present disclosure may include a dyad element "+2" to a triad element "+3". Morphotropic phase boundary (MPB) may be implemented by adding the softener dopant material to the PZT-based material ($PbZrTiO_3$), and thus, a piezoelectric characteristic and a dielectric characteristic may be enhanced. For example, the softener dopant material may include strontium (Sr), barium (Ba), lanthanum (La), neodymium (Nd), calcium (Ca), yttrium (Y), erbium (Er), or ytterbium (Yb). For example, ions (for example, $Sr^{2+}$, $Ba^{2+}$, $La^{2+}$, $Nd^{3+}$, $Ca^{2+}$, $Y^{3+}$, $Er^{3+}$, and $Yb^{3+}$) of the softener dopant material doped into the PZT-based material ($PbZrTiO_3$) may substitute a portion of lead (Pb) in the PZT-based material ($PbZrTiO_3$), and a substitution rate thereof may be about 2 mol % to about 20 mol %. For example, when the substitution rate is smaller than 2 mol % or greater than 20 mol %, a perovskite crystal structure may be broken, and thus, an electromechanical coupling coefficient "kP" and the piezoelectric deformation coefficient "$d_{33}$" may decrease. When the softener dopant material is substituted, the MPB may be formed, and a piezoelectric characteristic and a dielectric characteristic may be high in the MPB, thereby implementing a vibration apparatus having a high piezoelectric characteristic and a high dielectric characteristic.

According to an embodiment of the present disclosure, the relaxor ferroelectric material doped into the PZT-based material ($PbZrTiO_3$) may enhance an electric deformation characteristic of the inorganic material portion. The relaxor ferroelectric material according to an embodiment of the present disclosure may include a PMN-based material, a PNN-based material, a PZN-based material, or a PIN-based material, but embodiments of the present disclosure are not limited thereto. The PMN-based material may include Pb, Mg, and Nb, and for example, may include $Pb(Mg, Nb)O_3$. The PNN-based material may include Pb, Ni, and Nb, and for example, may include $Pb(Ni, Nb)O_3$. The PZN-based material may include Pb, Zr, and Nb, and for example, may include $Pb(Zn, Nb)O_3$. The PIN-based material may include Pb, In, and Nb, and for example, may include $Pb(In, Nb)O_3$. For example, the relaxor ferroelectric material doped into the PZT-based material ($PbZrTiO_3$) may substitute a portion of each of zirconium (Zr) and titanium (Ti) in the PZT-based material ($PbZrTiO_3$), and a substitution rate thereof may be about 5 mol % to about 25 mol %. For example, when the substitution rate is smaller than 5 mol % or greater than 25 mol %, a perovskite crystal structure may be broken, and thus, the electromechanical coupling coefficient "kP" and the piezoelectric deformation coefficient "$d_{33}$" may decrease.

According to an embodiment of the present disclosure, the vibration apparatus 130 or the vibration device 131 may further include a donor material doped into B site (ZrTi) of the PZT-based material ($PbZrTiO_3$), in order to more enhance a piezoelectric coefficient. For example, the donor material doped into the B site (ZrTi) may include a tetrad element "+4" or a hexad element "+6". For example, the donor material doped into the B site (ZrTi) may include tellurium (Te), germanium (Ge), uranium (U), bismuth (Bi), niobium (Nb), tantalum (Ta), antimony (Sb), or tungsten (W).

The vibration apparatus 130 or the vibration device 131 according to an embodiment of the present disclosure may have a piezoelectric deformation coefficient "$d_{33}$" of 1,000 pC/N or more in the thickness direction Z, and thus, a vibration apparatus having an enhanced vibration characteristic may be implemented. For example, a vibration apparatus having an enhanced vibration characteristic may be implemented in an apparatus or a vibration object having a large area.

According to another embodiment of the present disclosure, the vibration apparatus 130 may not be disposed at the rear surface of the vibration member 100 and may be applied to a non-display panel instead of the display panel. For example, the non-display panel may be one or more of wood, plastic, glass, metal, cloth, fiber, rubber, paper, leather, an interior material of a vehicle, an indoor ceiling of a building, and an interior material of an aircraft, but embodiments of the present disclosure are not limited thereto. In this case, the non-display panel may be applied as a vibration plate, and the vibration apparatus 130 may vibrate the non-display panel to output a sound.

For example, an apparatus according to an embodiment of the present disclosure may include a vibration member (or a vibration object) and the vibration apparatus 130 disposed in the vibration member. For example, the vibration member may include a display panel including a pixel displaying an image, or may include a non-display panel. For example, the vibration member may include a display panel including a pixel displaying an image, or may be one or more of wood, plastic, glass, metal, cloth, fiber, rubber, paper, leather, mirror, an interior material of a vehicle, a glass window of a vehicle, an indoor ceiling of a building, a glass window of a building, an interior material of a building, an interior material of an aircraft, and a glass window of an aircraft, but embodiments of the present disclosure are not limited thereto. For example, the vibration member may include one or more of a display panel including a pixel displaying an image, a screen panel on which an image is projected from a display apparatus, a lighting panel, a signage panel, a vehicular interior material, a vehicular glass window, a vehicular exterior material, a ceiling material of a building, an interior material of a building, a glass window of a building, an interior material of an aircraft, a glass window of an aircraft, and mirror, but embodiments of the present disclosure are not limited thereto. For example, the non-display panel may be a light emitting diode lighting panel (or apparatus), an organic light emitting diode lighting panel (or apparatus), or an inorganic light emitting diode lighting panel (or apparatus), but embodiments of the present disclosure are not limited thereto. For example, the vibration member may include a display panel including a pixel displaying an image, or may be one or more of a light emitting diode lighting panel (or apparatus), an organic light emitting diode lighting panel (or apparatus), or an inorganic light emitting diode lighting panel (or apparatus), but embodiments of the present disclosure are not limited thereto.

According to another embodiment of the present disclosure, the vibration member may include a plate. The plate may include a metal material, or may include a single nonmetal material or a complex nonmetal material including one or more of metal, wood, plastic, glass, cloth, fiber, rubber, paper, mirror, and leather, but embodiments of the present disclosure are not limited thereto. According to another embodiment of the present disclosure, the vibration member may include a plate. The plate may include one or more of metal, wood, plastic, glass, cloth, fiber, rubber, paper, mirror, and leather, but embodiments of the present disclosure are not limited thereto. For example, the paper may be a cone paper for speakers. For example, the cone paper may be pulp or foam plastic, but embodiments of the present disclosure are not limited thereto. For example, the vibration member may be a vibration object, a vibration plate, or a front member, but embodiments of the present disclosure are not limited thereto.

The vibration apparatus 130 according to an embodiment of the present disclosure may be disposed at the rear surface of the display panel 100 to overlap the display area of the display panel 100. For example, the vibration apparatus 130 may overlap a display area, corresponding to half or more, of the display area of the display panel 100. According to another embodiment of the present disclosure, the vibration apparatus 130 may overlap the whole display area of the display panel 100.

When an alternating current (AC) voltage is applied, the vibration apparatus 130 according to an embodiment of the present disclosure may alternately contract and expand based on an inverse piezoelectric effect and may vibrate the display panel 100 based on a vibration. According to an embodiment of the present disclosure, the vibration apparatus 130 may vibrate based on a voice signal synchronized with an image displayed by the display panel to vibrate the display panel 100. According to another embodiment of the present disclosure, the vibration apparatus 130 may vibrate based on a haptic feedback signal (or a tactile feedback signal) synchronized with a user touch applied to a touch panel (or a touch sensor layer) which is disposed on the display panel 100 or embedded into the display panel 100, and thus, may vibrate the display panel 100. Accordingly, the display panel 100 may vibrate based on a vibration of the vibration apparatus 130 to provide a user (or a viewer) with one or more of a sound and a haptic feedback.

Therefore, the apparatus according to an embodiment of the present disclosure may output a sound, generated by a vibration of the vibration member 100 based on a vibration of the vibration apparatus 130, in a forward direction of the vibration member 100. Also, the apparatus according to an embodiment of the present disclosure may vibrate a large region of the vibration member 100 by the vibration apparatus 130 of a film type, thereby more enhancing a sense of sound localization and a sound pressure level characteristic of a sound based on a vibration of the vibration member 100.

The apparatus according to an embodiment of the present disclosure may further include a connection member 150 (or a first connection member) between the vibration apparatus 130 and the vibration member 100 or the display panel.

For example, the connection member 150 may be disposed between the vibration apparatus 130 and the rear surface of the vibration member 100 or the display panel, and thus, may connect or couple the vibration apparatus 130 to the rear surface of the vibration member 100. For example, the vibration apparatus 130 may be connected or coupled to the rear surface of the vibration member 100 or the display panel by the connection member 150, and thus, may be supported by or disposed at the rear surface of the vibration member 100 or the display panel. For example, the vibration apparatus 130 may be disposed at the rear surface of the vibration member 100 or the display panel by the connection member 150.

The connection member 150 according to an embodiment of the present disclosure may include a material including an adhesive layer which is good in adhesive force or attaching force with respect to each of the rear surface of the vibration member 100 and the vibration apparatus 130. For example, the connection member 150 may include a foam pad, a double-sided tape, or an adhesive, but embodiments of the present disclosure are not limited thereto. For example, an adhesive layer of the connection member 150 may include epoxy, acryl, silicone, or urethane, but embodiments of the present disclosure are not limited thereto. For example, the adhesive layer of the connection member 150 may include an acryl-based material, having a characteristic where an adhesive force is relatively good and hardness is high, among acryl and urethane. Accordingly, a vibration of the vibration apparatus 130 may be well transferred to the vibration member 100.

The adhesive layer of the connection member 150 may further include an additive such as a tackifier, a wax component, or an anti-oxidation agent, but embodiments of the present disclosure are not limited thereto. The additive may prevent the connection member 150 from being detached (stripped) from the vibration member 100 by a vibration of the vibration apparatus 130. For example, the tackifier may be rosin derivative, the wax component may be paraffin wax, and the anti-oxidation agent may be a phenol-based anti-oxidation agent such as thiolester, but embodiments of the present disclosure are not limited thereto.

According to another embodiment of the present disclosure, the connection member 150 may further include a hollow portion provided between the vibration apparatus 130 and the vibration member 100. The hollow portion of the connection member 150 may provide an air gap between the vibration apparatus 130 and the vibration member 100 or the display panel. Based on the air gap, a sound wave (or a sound pressure level) based on a vibration of the vibration apparatus 130 may not be dispersed by the connection member 150 and may concentrate on the vibration member 100 or the display panel, and thus, the loss of a vibration based on the connection member 150 may be minimized, thereby increasing a sound pressure level characteristic and/or a sound characteristic of a sound generated based on a vibration of the vibration member 100.

The apparatus 10 according to an embodiment of the present disclosure may further include a supporting member 300 which is disposed at the rear surface (or a backside surface) of the vibration member 100.

The supporting member 300 may be disposed at the rear surface of the vibration member 100 or the display panel. For example, the supporting member 300 may cover the whole rear surface of the vibration member 100 or the display panel. For example, the supporting member 300 may include one or more of a glass material, a metal material, and a plastic material. For example, the supporting member 300 may be a rear structure material, a set structure material, a supporting structure material, a supporting cover, a rear member, a case, or a housing, but the terms are not limited thereto. The supporting member 300 may be referred to as the other term such as a cover bottom, a plate bottom, a back cover, a base frame, a metal frame, a metal chassis, a chassis base, or an m-chassis. For example, the supporting member 300 may be implemented as an arbitrary type frame or a plate structure material disposed at the rear surface of the vibration member 100.

An edge or a sharp corner portion of the supporting member 300 may have an inclined shape or a curved shape through a chamfer process or a corner rounding process. For example, the glass material of the supporting member 300 may be sapphire glass. In another embodiment of the present disclosure, the supporting member 300 including the metal material may include one or more materials of aluminum (Al), an Al alloy, a magnesium (Mg), a magnesium (Mg) alloy, and an iron (Fe)-nickel (Ni) alloy.

The apparatus according to an embodiment of the present disclosure may further include a middle frame 400. The middle frame 400 may be disposed between a rear edge (or a rear periphery) of the display panel or the display panel 100 and a front edge (or a front periphery) of the supporting member 300. The middle frame 400 may support one or more of an edge portion (or a periphery portion) of the display panel and an edge portion (or a periphery portion) of the supporting member. The middle frame 400 may surround one or more of lateral surfaces of each of the display panel and the supporting member 300. The middle frame 400 may provide the air space GS between the display panel and the supporting member 300. The middle frame 400 may be referred to as a middle cabinet, a middle cover, a middle chassis, a connection member, a frame, a frame member, a middle member, or a lateral cover member, but the terms are not limited thereto.

The middle frame 400 according to an embodiment of the present disclosure may include a first supporting portion 410 and a second supporting portion 430. For example, the first supporting portion 410 may be a supporting portion, but the terms are not limited thereto. For example, the second supporting portion 430 may be a sidewall portion, but the terms are not limited thereto.

The first supporting portion 410 may be disposed between a rear edge (or a rear periphery) of the display panel or the display panel 100 and a front edge (or a front periphery) of the supporting member 300, and thus, may provide a gap space GS between the display panel or the display panel 100 and the supporting member 300. A front surface of the first supporting portion 410 may be coupled or connected to the rear edge (or the rear periphery) of the display panel or the display panel 100 by a first adhesive member 401. A rear surface of the first supporting portion 410 may be coupled or connected to the front edge (or the front periphery) of the supporting member 300 by a second adhesive member 403. For example, the first supporting portion 410 may have a single picture frame structure having a tetragonal shape or a picture frame structure having a plurality of division bar forms, but embodiments of the present disclosure are not limited thereto.

The second supporting portion 430 may be disposed in parallel with a thickness direction Z of the apparatus. For example, the second supporting portion 430 may be vertically coupled to an outer surface of the first supporting portion 410 in parallel with the thickness direction Z of the apparatus. The second supporting portion 430 may surround one or more of an outer surface of the display panel 100 and an outer surface of the supporting member 300, thereby protecting the outer surface of each of the display panel 100 and the supporting member 300. The first supporting portion 410 may protrude from an inner surface of the second supporting portion 430 to the gap space GS between the display panel 100 and the supporting member 300.

The apparatus according to an embodiment of the present disclosure may include a panel connection member (or a connection member) instead of the middle frame 400.

The panel connection member may be disposed between the rear edge (or the rear periphery) of the display panel 100 and the front edge (or the front periphery) of the supporting member 300, and thus, may provide a gap space GS between the display panel 100 and the supporting member 300. The panel connection member may be disposed between the rear edge (or the rear periphery) of the display panel 100 and the front edge (or the front periphery) of the supporting member 300 and may attach the display panel 100 on the supporting member 300. For example, the panel connection member may be implemented with a double-sided tape, a single-sided tape, or a double-sided foam tape, but embodiments of the present disclosure are not limited thereto. For example, an adhesive layer of the panel connection member may include epoxy, acryl, silicone, or urethane, but embodiments of the present disclosure are not limited thereto. For example, in order to minimize the transfer of a vibration of the display panel 100 to the supporting member 300, the adhesive layer of the panel connection member may include an acryl-based material, having a characteristic where an adhesive force is relatively good and hardness is high, among acryl and urethane. Accordingly, a vibration of the display panel 500 transferred to the supporting member 300 may be minimized.

According to another embodiment of the present disclosure, the middle frame 400 may be omitted. Instead of the middle frame 400, a panel connection member or an adhesive may be provided. According to another embodiment of the present disclosure, instead of the middle frame 400, a partition may be provided.

Referring to FIG. 2, the supporting member 300 may cover a whole rear surface of the vibration member 100 with a gap space therebetween. The supporting member 300 may be apart from a rearmost surface of the display panel or the vibration member 100 with the gap space therebetween, or may be apart from the vibration apparatus 130. For example, a gap space may be referred to as an air gap, a vibration space, or a sound sounding box, but the terms are not limited thereto. The gap space may provide an air gap. The air gap may be needed for resonance of a radiation sound which is generated by contacting the supporting member 300. Based on the air gap, a sound pressure level characteristic of a low-pitched sound band of the vibration apparatus 130 may be enhanced, but the inventors have recognized a problem where a thickness of an apparatus is thickened, a reflected sound is generated as a vibration of the vibration member 100 contacts the supporting member 300, and the sound quality of the vibration apparatus 130 is reduced by the reflected sound. Also, when the supporting member 300 and the vibration apparatus 130 are not fixed due to the air gap, the inventors have recognized a problem where the flatness of a sound pressure level is reduced because a peak and/or dip occur(s) in a middle-pitched sound band, and due to this, a sound pressure level characteristic and a sound characteristic are reduced. Also, in a case where a hole is formed in the supporting member 300 so as to improve a sound of a low-pitched sound band, the inventors have recognized a problem where sound quality is degraded due to penetration of external particles caused by the hole, or an aesthetic sense of an apparatus is reduced due to the hole. Therefore, the inventors have performed various experiments for decreasing a thickness without a reduction in aesthetic sense and sound quality of an apparatus. Through the various experiments, the inventors have invented an apparatus including a vibration apparatus for decreasing a thickness of the apparatus without a reduction in aesthetic sense and sound quality.

Referring to FIG. 2, the supporting member 300 according to an embodiment of the present disclosure may include a metamaterial. For example, the metamaterial may be a material which is designed to implement physical and optical characteristic through a structural deformation of the material. For example, the metamaterial may be designed to interact with a wave of a sound wave based on a fine structure which is mainly repeated. A material including the metamaterial may be a composite material or aluminum (Al), but the terms are not limited thereto. For example, the composite material may be formed of three layers. A third layer may be provided between a first layer and a second layer. The first layer and the second layer may be disposed apart from each other so as to be opposite to each other. The first layer and the second layer may have a thin plate shape. The first layer and the second layer may include the same material. For example, the first layer and the second layer may include a metal material which is good in thermal conductivity. For example, the metal material may be aluminum, but embodiments of the present disclosure are not limited thereto. The third layer may include a plastic material. For example, the third layer may include polyethylene or polypropylene, but embodiments of the present disclosure are not limited thereto. As another example, the third layer may include a compound including a polymer resin layer. For example, the third layer may be formed by a combination of $Mg(OH)_2$, ethylene vinyl acetate, and polyethylene. As another example, the metamaterial may include a material which is good in sound absorption characteristic. For example, the metamaterial may include glass wool and polyester, but embodiments of the present disclosure are not limited thereto. The metamaterial may be an acoustic metamaterial. For example, the acoustic metamaterial may adjust a sound wave refractive index of a material to increase or decrease a speed of a sound wave. The apparatus according to an embodiment of the present disclosure may include the supporting member 300 including the metamaterial, and thus, may absorb a resonance of a radiation sound occurring in a rear surface of the vibration apparatus 130 and the reflected sound which is generated by contacting the supporting member 300. Accordingly, a sound pressure level characteristic and/or a sound characteristic of the vibration apparatus 130 may be enhanced. Also, according to an embodiment of the present disclosure, in a case where a hole is formed in the supporting member so as to improve a sound of the low-pitched sound band, a problem may be solved where sound quality is degraded due to penetration of external particles caused by the hole, or an aesthetic sense of an apparatus is reduced due to the hole.

The vibration apparatus 130 according to an embodiment of the present disclosure may be fixed to the supporting member 300 with an air gap, and thus, sound quality or the flatness of a sound (or a sound wave) may be enhanced, a resonance of a frequency band may be adjusted, and a reflected sound may be absorbed. Accordingly, a sound pressure level characteristic and/or a sound characteristic of the low-pitched sound band of the vibration apparatus 130 may be enhanced. Sound quality or the flatness of a sound (or a sound wave) may be a magnitude of a deviation between a highest sound pressure level and a lowest sound pressure level.

Referring to FIG. 2, the metamaterial of the supporting member 300 may be formed as a zigzag coil type, but embodiments of the present disclosure are not limited thereto. For example, the metamaterial of the supporting member 300 may be formed as the zigzag coil type by a 3D printing process, but embodiments of the present disclosure are not limited thereto. According to an embodiment of the present disclosure, by a hole having the zigzag coil type, the supporting member 300 may absorb a resonance of a radiation sound occurring in the rear surface of the vibration apparatus 130 and the reflected sound which is generated by contacting the supporting member 300. Accordingly, a sound pressure level characteristic and/or a sound characteristic of the low-pitched sound band may be enhanced.

Referring to FIG. 3A, the metamaterial of the supporting member 300 may be formed as a Helmholtz resonance type. For example, the Helmholtz resonance type may include a hole which resonates air at a specific frequency to absorb a sound. For example, because the supporting member 300 is formed as a Helmholtz resonance type, a resonance of a radiation sound occurring in the rear surface of the vibration apparatus 130 and the reflected sound generated by contacting the supporting member 300 may be absorbed by a hole having the Helmholtz resonance type. Accordingly, a sound pressure level characteristic and/or a sound characteristic of the low-pitched sound band may be enhanced. Referring to FIG. 3B, the metamaterial of the supporting member 300 may be formed as a pyramid type. For example, even when the metamaterial of the supporting member 300 is formed as a pyramid type, the supporting member 300 may absorb a resonance of a radiation sound occurring in the rear surface of the vibration apparatus 130 and the reflected sound generated by contacting the supporting member 300. Accordingly, a sound pressure level characteristic and/or a sound characteristic of the low-pitched sound band may be enhanced. According to an embodiment of the present disclosure, the metamaterial of the supporting member 300 may be formed as one or more of the zigzag coil type, the Helmholtz resonance type, and the pyramid type.

Figure 4A:
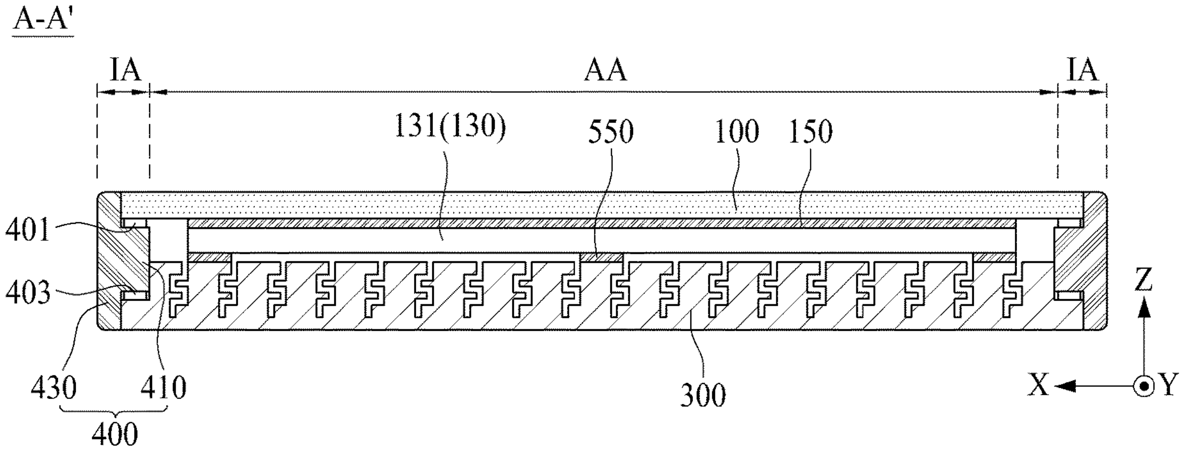
FIG. 4A is another cross-sectional view taken along line A-A' illustrated in FIG. 1.
Figure 4B:
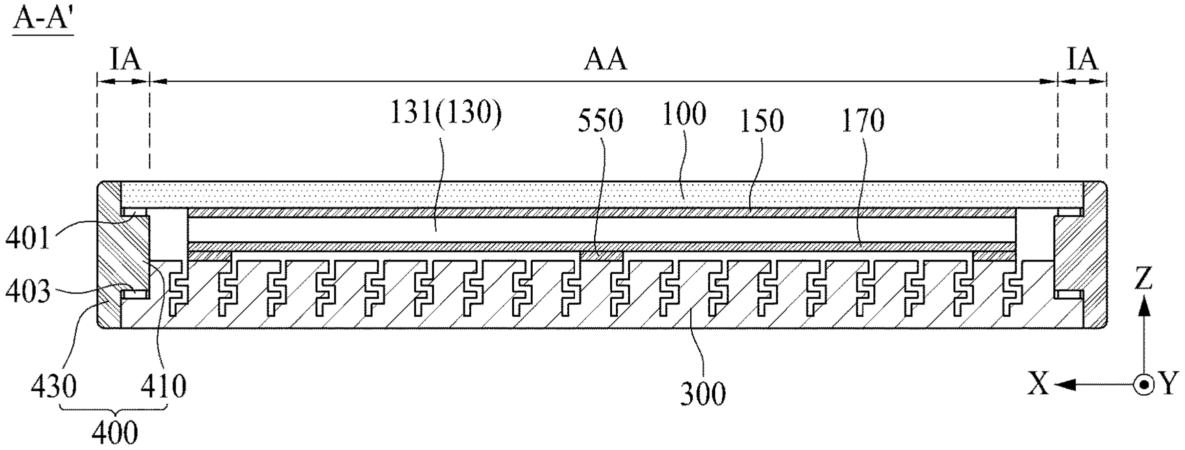
FIG. 4B is another cross-sectional view taken along line A-A' illustrated in FIG. 1.

FIG. 4A is another cross-sectional view taken along line A-A' illustrated in FIG. 1. FIG. 4B is another cross-sectional view taken along line A-A' illustrated in FIG. 1.

Referring to FIGS. 4A and 4B, an apparatus according to another embodiment of the present disclosure may include a vibration member 100 and a vibration apparatus 130 disposed at a rear surface (or a backside surface) of the vibration member 100. Descriptions of the vibration member and the vibration apparatus may be the same as details described above with reference to FIGS. 1 to 3B, and thus, are omitted or will be briefly given below.

The apparatus according to another embodiment of the present disclosure may further include a third connection member 550 between the vibration apparatus 130 and a supporting member 300. The third connection member 550 may attach the vibration apparatus 130 on the supporting member 300. For example, the third connection member 550 may be disposed between a rear surface of the vibration apparatus 130 and the supporting member 300 and may connect or couple the vibration apparatus 130 to the supporting member 300. For example, the vibration apparatus 130 may be connected or coupled to the supporting member 300 by the third connection member 550, and thus, may be supported by or disposed at the supporting member 300.

The third connection member 550 according to an embodiment of the present disclosure may be disposed at the rear surface of the vibration apparatus 130. For example, the third connection member 550 may be partially disposed at the rear surface (or backside surface) of the vibration apparatus 130. For example, the third connection member 550 may be partially disposed at a front surface (or a top surface) of the supporting member 300. For example, when the third connection member 550 is partially disposed at the rear surface of the vibration apparatus 130, a sound pressure level of a low-pitched sound band may be more enhanced than a case where the third connection member 550 is disposed at the whole rear surface of the vibration apparatus 130. For example, when a hole of a metamaterial in the supporting member 300 is covered by the third connection member 550, it may be difficult to improve a sound of the low-pitched sound band of the vibration apparatus 130. Therefore, the third connection member 550 may be partially disposed at the rear surface of the vibration apparatus 130 and may be disposed not to overlap the hole of the metamaterial in the supporting member 300. Therefore, the apparatus may further absorb a resonance of a radiation sound occurring in the rear surface of the vibration apparatus 130 and a reflected sound which is generated by contacting the supporting member 300. For example, the third connection member 550 may be disposed at a center of the vibration apparatus 130 and both edges (or both peripheries) of the vibration apparatus 130. For example, the third connection member 550 may be disposed at a center of the rear surface of the vibration apparatus 130 and both edges (or both peripheries) of the rear surface of the vibration apparatus 130. The third connection member 550 may be disposed at a center of the supporting member 300 and both edges (or both peripheries) of the supporting member 300. For example, the third connection member 550 may be disposed at a center of a front surface of the supporting member 300 and both edges (or both peripheries) of the front surface of the supporting member 300. The third connection member 550 may be disposed at a center of the rear surface of the vibration apparatus 130 or a center of the supporting member 300 and both edges (or both peripheries) of the rear surface of the vibration apparatus 130 or both edges (or both peripheries) of the supporting member 300. The third connection member 550 may be disposed at a center of the rear surface of the vibration apparatus 130 or a center of the front surface of the supporting member 300 and both edges (or both peripheries) of the rear surface of the vibration apparatus 130 or both edges (or both peripheries) of the front surface of the supporting member 300. However, embodiments of the present disclosure are not limited thereto, and when the third connection member 550 is configured not to cover all of the hole of the metamaterial, the third connection member 550 may be disposed at a certain position of the rear surface of the vibration apparatus. Accordingly, a sound of the low-pitched sound band of the vibration apparatus 130 may be more enhanced.

According to an embodiment of the present disclosure, because the third connection member 550 is provided at centers of four surfaces of the rear surface of the vibration apparatus 130, a peak and/or dip may be improved. Accordingly, a peak and/or dip in a middle-high-pitched sound band may be improved, thereby providing an apparatus having an enhanced sound pressure level characteristic and/or sound characteristic. For example, a peak may be a phenomenon where a sound pressure level bounces in a specific frequency, and dip may be a phenomenon where a low sound pressure level occurs because the occurrence of a sound having a specific frequency is prevented. For example, the low-pitched sound band may be 1 kHz or less, the middle-pitched sound band may be 1 kHz to 5 kHz, and the high-pitched sound band may be 5 kHz or more, but embodiments of the present disclosure are not limited thereto.

The third connection member 550 according to an embodiment of the present disclosure may include a material including an adhesive layer which is good in adhesive force or attaching force with respect to each of the rear surface of the vibration apparatus 130 and the supporting member 300. For example, the third connection member 550 may include a foam pad, a double-sided tape, or an adhesive, but embodiments of the present disclosure are not limited thereto. For example, an adhesive layer of the third connection member 550 may include epoxy, acryl, silicone, or urethane, but embodiments of the present disclosure are not limited thereto. For example, the adhesive layer of the third connection member 550 may include an acryl-based material, having a characteristic where an adhesive force is relatively good and hardness is high, among acryl and urethane.

The adhesive layer of the third connection member 550 may further include an additive such as a tackifier, a wax component, or an anti-oxidation agent, but embodiments of the present disclosure are not limited thereto. The additive may prevent the third connection member 550 from being detached (stripped) from the vibration member 100 by a vibration of the vibration apparatus 130. For example, the tackifier may be rosin derivative, the wax component may be paraffin wax, and the anti-oxidation agent may be a phenol-based anti-oxidation agent such as thioester, but embodiments of the present disclosure are not limited thereto. For example, the third connection member 550 may include the same material as that of the connection member 150, but embodiments of the present disclosure are not limited thereto.

Referring to FIG. 4B, a plate may be additionally provided in the apparatus illustrated in FIG. 4A. The apparatus according to an embodiment of the present disclosure may further include a plate 170. For example, the plate 170 may be disposed between the vibration apparatus 130 and the third connection member 550. The plate 170 may adjust a resonance of a frequency band of the vibration apparatus 130. Therefore, the flatness of a sound pressure level characteristic of the vibration apparatus 130 may be enhanced. Here, the flatness of a sound pressure level characteristic may be a magnitude of a deviation between a highest sound pressure level and a lowest sound pressure level. For example, the plate 170 may improve a sound of the low-pitched sound band and/or flatness of a sound pressure level characteristic of the vibration apparatus 130 along with the supporting member 300 including the metamaterial, and thus, may more enhance a sound pressure level characteristic and/or a sound characteristic of the vibration apparatus 130. The plate 170 may have the same shape and size as those of the vibration apparatus 130. In another embodiment of the present disclosure, the plate 170 may have a size which differs from that of the vibration apparatus 130. For example, the plate 170 may have a size which is less than or equal to that of the vibration apparatus 130. In another embodiment of the present disclosure, the plate 170 may have the same shape and size as those of the vibration member 100. The plate 170 may have a size which differs from that of the vibration member 100. For example, the plate 170 may have a size which is less than that of the vibration member 100. The plate 170 according to an embodiment of the present disclosure may include a metal material. For example, the plate 170 may include one or more materials of stainless steel, aluminum (Al), a magnesium (Mg), a magnesium (Mg) alloy, a magnesium-lithium (Mg—Li) alloy, and an Al alloy, but embodiments of the present disclosure are not limited thereto. According to an embodiment of the present disclosure, the plate 170 may be applied to FIGS. 3A and 3B.

According to another embodiment of the present disclosure, a plate 170 may be further provided between the vibration member 100 and the vibration apparatus 130. The plate 170 may reinforce a mass of the vibration apparatus 130. For example, the plate 170 may reinforce a mass of the vibration apparatus 130 which is disposed or hung on the rear surface of the vibration member 100. Therefore, the plate 170 may decrease a resonance frequency of the vibration apparatus 130 based on an increase in mass of the vibration apparatus 130. Therefore, the plate 170 may increase a sound characteristic of the low-pitched sound band and a sound pressure level characteristic of the low-pitched sound band generated based on a vibration of the vibration apparatus 130. Here, the flatness of a sound pressure level characteristic may be a magnitude of a deviation between a highest sound pressure level and a lowest sound pressure level. For example, the plate 170 may be referred to as a weight member, a mass member, or a sound planarization member, but the terms are not limited thereto. For example, the plate 170 may have the same shape and size as those of the vibration member 100. The plate 170 may have a size which differs from that of the vibration member 100. For example, the plate 170 may have a size which is less than that of the vibration member 100. For example, the plate 170 may include a metal material. For example, the plate 170 may include one or more materials of stainless steel, aluminum (Al), a magnesium (Mg), a magnesium (Mg) alloy, a magnesium-lithium (Mg—Li) alloy, and an Al alloy, but embodiments of the present disclosure are not limited thereto. According to an embodiment of the present disclosure, the plate 170 may be applied to FIGS. 3A and 3B.

The plate 170 according to an embodiment of the present disclosure may include a plurality of opening portions. The plurality of opening portions may be configured to have a predetermined size and a predetermined interval. For example, the plurality of opening portions may be provided along a first direction X and a second direction Y so as to have a predetermined size and a predetermined interval. Due to the plurality of opening portions, a sound wave (or a sound pressure) based on a vibration of the vibration apparatus 130 may not be dispersed by the plate 170, and may concentrate on the vibration member 100. Thus, the loss of a vibration caused by the plate 170 may be minimized, thereby increasing a sound pressure level characteristic of a sound generated based on a vibration of the vibration member 100. For example, the plate 170 including the plurality of openings may have a mesh shape. For example, the plate 170 including the plurality of openings may be a mesh plate.

According to another embodiment of the present disclosure, the plate 170 may be connected or coupled to the rear surface of the vibration member 100. For example, when the vibration member 100 is a light emitting display panel which is a display panel, the plate 170 may be disposed at a rear surface of an encapsulation portion of the light emitting display panel. The plate 170 may be configured in a structure where the plate 170 is disposed on and bonded to the rear surface of the encapsulation portion. The plate 170 may dissipate heat which occurs in the display panel. For example, the plate 170 may be referred to as a heat dissipation member, a heat dissipation plate, or a heat sink, but the terms are not limited thereto.

Figure 5:
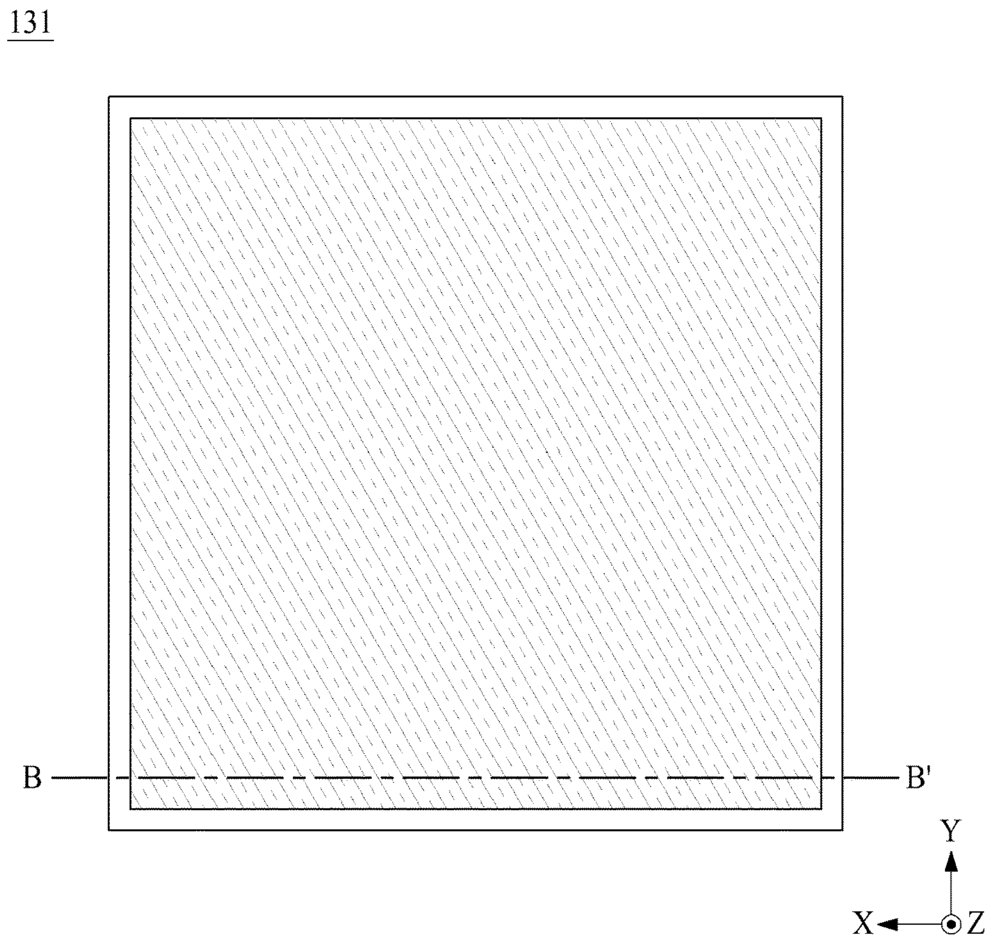
FIG. 5 illustrates a vibration apparatus according to another embodiment of the present disclosure.
Figure 6:
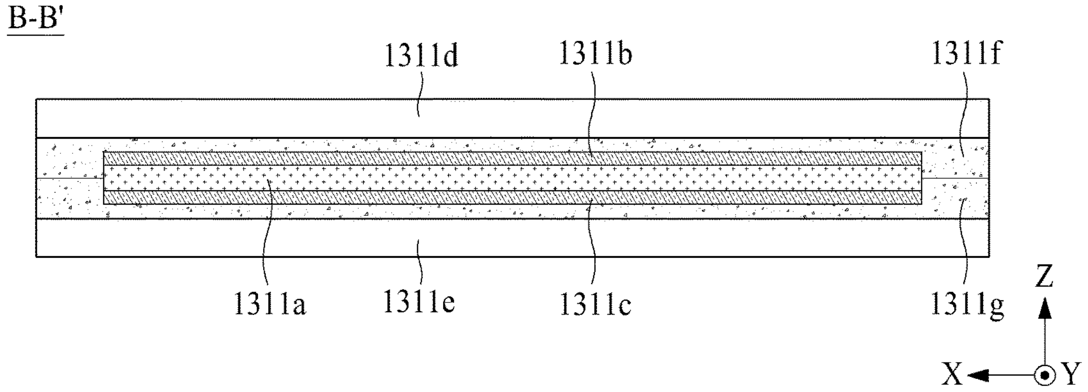
FIG. 6 is a cross-sectional view taken along line B-B' illustrated in FIG. 5.

FIG. 5 illustrates a vibration device according to another embodiment of the present disclosure. FIG. 6 is a cross-sectional view taken along line B-B' illustrated in FIG. 5.

Referring to FIGS. 5 to 6, a vibration device 131 according to an embodiment of the present disclosure may include a vibration portion 1311*a*, a first electrode portion 1311*b*, and a second electrode portion 1311*c*.

The vibration device 131 according to an embodiment of the present disclosure may be referred to as a flexible vibration structure material, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but the terms are not limited thereto.

The vibration portion 1311*a* may include a piezoelectric material. For example, the vibration portion 1311*a* may include the piezoelectric material (or an electro active material) having a piezoelectric effect. For example, the piezoelectric material may have a characteristic where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. The vibration portion 1311*a* may be referred to as the terms such as a vibration layer, a piezoelectric layer, a piezoelectric material layer, an electro active layer, a vibration portion, a piezoelectric material portion, an electro active portion, a piezoelectric structure material, a piezoelectric composite layer, a piezoelectric composite, or a piezoelectric ceramic composite, but the terms are not limited thereto. The vibration portion 1311*a* may include a transparent conductive material, a semitransparent conductive material, or an opaque conductive material and may be transparent, semitransparent, or opaque.

The vibration portion 1311*a* according to an embodiment of the present disclosure may include a ceramic-based material for generating a relatively high vibration, or may include a piezoelectric ceramic having a perovskite-based crystalline structure. The perovskite crystalline structure may have a piezoelectric effect and/or an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "O" may be anions. For example, the first portions 51*a* may include one or more of lead(II) titanate ($PbTiO_3$), lead zirconate ($PbZrO_3$), lead zirconate titanate($PbZrTiO_3$), barium titanate ($BaTiO_3$), and strontium titanate ($SrTiO_3$), but embodiments of the present disclosure are not limited thereto.

In a perovskite crystalline structure, a position of a center ion may be changed by an external stress or a magnetic field to vary polarization, and a piezoelectric effect may be generated based on the variation of the polarization. In a perovskite crystalline structure including $PbTiO_3$, a position of a Ti ion corresponding to a center ion may be changed to vary polarization, and thus, a piezoelectric effect may be generated. For example, in the perovskite crystalline structure, a cubic shape having a symmetric structure may be changed to a tetragonal shape, an orthorhombic shape, and a rhombohedral shape each having an unsymmetric structure by an external stress or a magnetic field, and thus, a piezoelectric effect may be generated. Polarization may be high at a morphotropic phase boundary (MPB) of a tetragonal structure and a rhombohedral structure, and polarization may be easily realigned, thereby obtaining a high piezoelectric characteristic.

According to an embodiment of the present disclosure, the vibration portion 1311*a* may include one or more materials among lead (Pb), zirconium (Zr), titanium (Ti), zinc (Zn), nickel (Ni), and niobium (Nb), but embodiments of the present disclosure are not limited thereto.

The vibration portion 1311*a* according to another embodiment of the present disclosure may include single crystalline ceramic and/or polycrystalline ceramic. The single crystalline ceramic may be a material where particles having a single crystal domain having a certain structure are regularly arranged. The polycrystalline ceramic may include irregular particles where various crystal domains are provided.

According to another embodiment of the present disclosure, the vibration portion 1311*a* may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. According to another embodiment of the present disclosure, the vibration portion 1311*a* may include one or more of calcium titanate ($CaTiO_3$), $BaTiO_3$, and $SrTiO_3$, each including no Pb, but embodiments of the present disclosure are not limited thereto.

According to another embodiment of the present disclosure, the vibration portion 1311*a* may have a piezoelectric deformation coefficient "$d_{33}$" of 1,000 pC/N or more in the thickness direction Z. By having a high piezoelectric deformation coefficient "$d_{33}$", it is possible to provide the vibrating apparatus that may be applied to a display panel or a vibration member (or a vibration object) having a large size or may have a sufficient vibration characteristic or piezoelectric characteristic. For example, in order to have a high piezoelectric deformation coefficient "$d_{33}$", the inorganic material portion may include a PZT-based material ($PbZrTiO_3$) as a main component and may include a softener dopant material doped into A site (Pb) and a relaxor ferroelectric material doped into B site (ZrTi).

The softener dopant material may enhance a piezoelectric characteristic and a dielectric characteristic of the vibration portion 1311*a*. For example, the softener dopant material may increase the piezoelectric deformation coefficient "$d_{33}$" of the inorganic material portion. The softener dopant material according to an embodiment of the present disclosure may include a dyad element "+2" to a triad element "+3". Morphotropic phase boundary (MPB) may be implemented by adding the softener dopant material to the PZT-based material ($PbZrTiO_3$), and thus, a piezoelectric characteristic and a dielectric characteristic may be enhanced. For example, the softener dopant material may include strontium (Sr), barium (Ba), lanthanum (La), neodymium (Nd), calcium (Ca), yttrium (Y), erbium (Er), or ytterbium (Yb). For example, ions (for example, $Sr^{2+}$, $Ba^{2+}$, $La^{2+}$, $Nd^{3+}$, $Ca^{2+}$, $Y^{3+}$, $Er^{3+}$, and $Yb^{3+}$) of the softener dopant material doped into the PZT-based material ($PbZrTiO_3$) may substitute a portion of lead (Pb) in the PZT-based material ($PbZrTiO_3$), and a substitution rate thereof may be about 2 mol % to about 20 mol %. For example, when the substitution rate is smaller than 2 mol % or greater than 20 mol %, a perovskite crystal structure may be broken, and thus, an electromechanical coupling coefficient "kP" and the piezoelectric deformation coefficient "$d_{33}$" may decrease. When the softener dopant material is substituted, the MPB may be formed, and a piezoelectric characteristic and a dielectric characteristic may be high in the MPB, thereby implementing a vibration apparatus having a high piezoelectric characteristic and a high dielectric characteristic.

According to an embodiment of the present disclosure, the relaxor ferroelectric material doped into the PZT-based material ($PbZrTiO_3$) may enhance an electric deformation characteristic of the inorganic material portion. The relaxor ferroelectric material according to an embodiment of the present disclosure may include a PMN-based material, a PNN-based material, a PZN-based material, or a PIN-based material, but embodiments of the present disclosure are not limited thereto. The PMN-based material may include Pb, Mg, and Nb, and for example, may include $Pb(Mg, Nb)O_3$. The PNN-based material may include Pb, Ni, and Nb, and for example, may include $Pb(Ni, Nb)O_3$. The PZN-based material may include Pb, Zr, and Nb, and for example, may include $Pb(Zn, Nb)O_3$. The PIN-based material may include Pb, In, and Nb, and for example, may include $Pb(In, Nb)O_3$. For example, the relaxor ferroelectric material doped into the PZT-based material ($PbZrTiO_3$) may substitute a portion of each of zirconium (Zr) and titanium (Ti) in the PZT-based material ($PbZrTiO_3$), and a substitution rate thereof may be about 5 mol % to about 25 mol %. For example, when the substitution rate is smaller than 5 mol % or greater than 25 mol %, a perovskite crystal structure may be broken, and thus, the electromechanical coupling coefficient "kP" and the piezoelectric deformation coefficient "$d_{33}$" may decrease.

According to an embodiment of the present disclosure, the vibration portion 1311*a* may further include a donor material doped into B site (ZrTi) of the PZT-based material ($PbZrTiO_3$), in order to more enhance a piezoelectric coefficient. For example, the donor material doped into the B site (ZrTi) may include a tetrad element "+4" or a hexad element "+6". For example, the donor material doped into the B site (ZrTi) may include tellurium (Te), germanium (Ge), uranium (U), bismuth (Bi), niobium (Nb), tantalum (Ta), antimony (Sb), or tungsten (W).

The vibration portion 1311*a* according to an embodiment of the present disclosure may have a piezoelectric deformation coefficient "$d_{33}$" of 1,000 pC/N or more in the thickness direction Z, and thus, a vibration apparatus having an enhanced vibration characteristic may be implemented. For example, a vibration apparatus having an enhanced vibration characteristic may be implemented in an apparatus or a vibration object having a large area.

The first electrode portion 1311*b* may be disposed at a first surface (or an upper surface) of the vibration portion 1311*a* and may be electrically connected to a first surface of the vibration portion 1311*a*. The second electrode portion 1311*c* may be disposed at a second surface (or a lower surface) of the vibration portion 1311*a* and may be electrically connected to a second surface of the vibration portion 1311*a*. For example, the vibration portion 1311*a* may be polarized (or poling) by a certain voltage applied to the first electrode portion 1311*b* and the second electrode portion 1311*c* in a certain temperature atmosphere or a temperature atmosphere which is changed from a high temperature to a room temperature, but embodiments of the present disclosure are not limited thereto.

For example, the first electrode portion 1311*b* may have a common electrode form which is disposed on a whole first surface of the vibration portion 1311*a*. The first electrode portion 1311*b* according to an embodiment of the present disclosure may include a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include aluminum (Al), copper (Cu), gold (Au), silver (Ag), molybdenum (Mo), or magnesium (Mg), or an alloy thereof, but embodiments of the present disclosure are not limited thereto.

The second electrode portion 1311*c* may be disposed at a second surface (or a rear surface or a backside surface), which is opposite to the first surface, of the vibration portion 1311*a* and may be electrically connected to the second surface of the vibration portion 1311*a*. For example, the second electrode portion 1311*c* may have a common electrode form which is disposed on the whole second surface of the vibration portion 1311*a*. The second electrode portion 1311*c* according to an embodiment of the present disclosure may include a transparent conductive material, a semitransparent conductive material, or an opaque conductive material. For example, the second electrode portion 1311*c* may include the same material as that of the first electrode portion 1311*b*, but embodiments of the present disclosure are not limited thereto. In another embodiment of the present disclosure, the second electrode portion 1311*c* may include a material which differs from that of the first electrode portion 1311*b*.

According to another embodiment of the present disclosure, the vibration device 131 (or the vibration apparatus 130) may further include a first cover member 1311*d* and a second cover member 1311*e*.

The first cover member 1311*d* may be disposed at a first surface of the vibration device 131. For example, the first cover member 1311*d* may be disposed at the first electrode portion 1311*b*. For example, the first cover member 1311*d* may be on the first electrode portion 1311*b*. For example, the first cover member 1311*d* may cover the first electrode portion 1311*b* disposed at the first surface of the vibration portion 1311*a*, and thus, may protect the first surface of the vibration portion 1311*a* or the first electrode portion 1311*b*.

The second cover member 1311*e* may be disposed at a second surface of the vibration device 131. For example, the second cover member 1311*e* may be disposed at the second electrode portion 1311*c*. For example, the second cover member 1311*e* may be on the second electrode portion 1311*c*. For example, the second cover member 1311*e* may cover the second electrode portion 1311*c* disposed at the second surface of the vibration portion 1311*a*, and thus, may protect the second surface of the vibration portion 1311*a* or the second electrode portion 1311*c*.

Each of the first cover member 1311*d* and the second cover member 1311*e* according to an embodiment of the present disclosure may include one or more materials of plastic, fiber, and wood, but embodiments of the present disclosure are not limited thereto. For example, the first cover member 1311*d* and the second cover member 1311*e* may include the same material or different materials. For example, the first cover member 1311*d* and the second cover member 1311*e* may be a polyimide film or a polyethylene terephthalate film, but embodiments of the present disclosure are not limited thereto.

According to another embodiment of the present disclosure, the vibration device 131 (or the vibration apparatus 130) may further include a first adhesive layer 1311*f* and a second adhesive layer 1311*g*. For example, the first adhesive layer 1311*f* may be disposed between the first cover member 1311*d* and the first electrode portion 1311*b*. For example, the second adhesive layer 1311*g* may be disposed between the second cover member 1311*e* and the second electrode portion 1311*c*.

The first cover member 1311*d* according to an embodiment of the present disclosure may be disposed at the first surface of the vibration portion 1311*a* by the first adhesive layer 1311*f*. For example, the first cover member 1311*d* may be connected or coupled to the first electrode portion 1311*b* by the first adhesive layer 1311*f*. For example, the first cover member 1311*d* may be disposed at the first surface of the vibration portion 1311*a* by a film laminating process using the first adhesive layer 1311*f*. Accordingly, the vibration portion 1311*a* may be provided (or disposed) as one body with the first cover member 1311*d*.

The second cover member 1311*e* according to an embodiment of the present disclosure may be disposed at the second surface of the vibration portion 1311*a* by the second adhesive layer 1311*g*. For example, the second cover member 1311*e* may be connected or coupled to the second electrode portion 1311*c* by the second adhesive layer 1311*g*. For example, the second cover member 1311*e* may be disposed at the second surface of the vibration portion 1311*a* by a film laminating process using the second adhesive layer 1311*g*. Accordingly, the vibration portion 1311*a* may be provided (or disposed) as one body with the second cover member 1311*e*.

For example, the first and second adhesive layers 1311*f* and 1311*g* may fully surround the vibration device 131. For example, the first and second adhesive layers 1311*f* and 1311*g* may be disposed between the first cover member 1311*d* and the second cover member 1311*e* to surround the vibration portion 1311*a*, the first electrode portion 1311*b*, and the second electrode portion 1311*c*. For example, the first and second adhesive layers 1311*f* and 1311*g* may be disposed between the first cover member 1311*d* and the second cover member 1311*e* to fully surround the vibration portion 1311*a*, the first electrode portion 1311*b*, and the second electrode portion 1311*c*. For example, the vibration portion 1311*a*, the first electrode portion 1311*b*, and the second electrode portion 1311*c* may be buried or embedded between the first adhesive layer 1311*f* and the second adhesive layer 1311*g*. For convenience of description, the first adhesive layer 1311*f* and the second adhesive layer 1311*g* are illustrated as the first adhesive layer 1311*f* and the second adhesive layer 1311*g*, but are not limited thereto and may be provided as one adhesive layer.

Each of the first adhesive layer 1311*f* and the second adhesive layer 1311*g* according to an embodiment of the present disclosure may include an electrical insulation material which has adhesive properties and is capable of compression and decompression. For example, each of the first adhesive layer 1311*f* and the second adhesive layer 1311*g* may include epoxy resin, acrylic resin, silicone resin, and urethane resin, but embodiments of the present disclosure are not limited thereto.

The vibration apparatus 130 according to an embodiment of the present disclosure may further include a signal cable.

The signal cable may be electrically connected to a pad portion disposed in the vibration apparatus 130 and may supply the vibration apparatus 200 with a vibration driving signal (or a sound signal) provided from a sound processing circuit. The signal cable according to an embodiment of the present disclosure may include a terminal, and the terminal may be electrically connected to a pad electrode of the pad portion. For example, the signal cable 219 may be configured as a flexible cable, a flexible printed circuit cable, a flexible flat cable, a single-sided flexible printed circuit, a single-sided flexible printed circuit board, a flexible multilayer printed circuit, or a flexible multi-layer printed circuit board (PCB), but embodiments of the present disclosure are not limited thereto. For example, the signal cable may be configured to be transparent, semitransparent, or opaque.

The sound processing circuit may generate an alternating current (AC) vibration driving signal including a first vibration driving signal and a second vibration driving signal based on a sound source. The first vibration driving signal may be one of a positive (+) vibration driving signal and a negative (−) vibration driving signal, and the second vibration driving signal may be one of a positive (+) vibration driving signal and a negative (−) vibration driving signal. For example, the first vibration driving signal may be supplied to the first electrode portion 1311*b* of the vibration device 131 through the terminal of the signal cable 219, the pad electrode of the pad portion, and a first power supply line. The second vibration driving signal may be supplied to the second electrode portion 1311*c* of the vibration device 131 through the terminal of the signal cable, the pad electrode of the pad portion, and a second power supply line.

According to an embodiment of the present disclosure, the vibration portion 1311*a* may be configured as one body by the first and second cover members 1311*d* and 1311*e*, thereby providing a vibration apparatus having a simplified structure and a thin thickness.

Figure 7A:
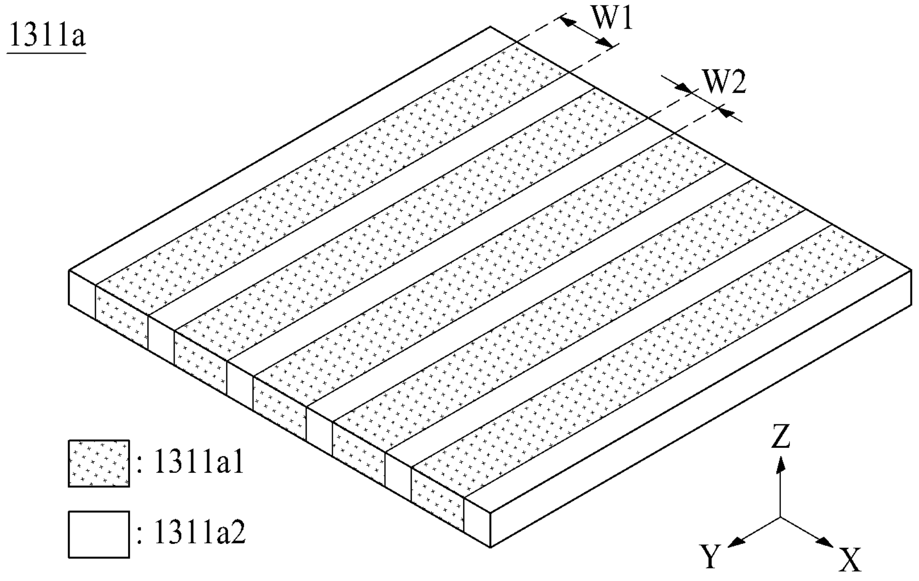
FIGS. 7A and 7B illustrate a vibration portion according to an embodiment of the present disclosure.
Figure 7B:
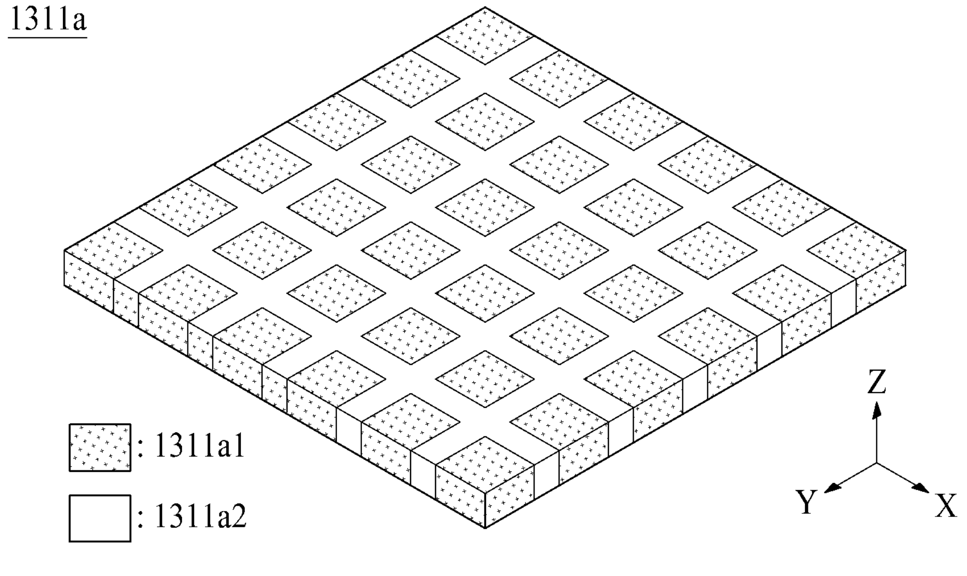

FIGS. 7A and 7B illustrate a vibration portion according to an embodiment of the present disclosure.

Referring to FIGS. 7A and 7B, the vibration device according to an embodiment of the present disclosure may be referred to as a flexible vibration structure material, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but the terms are not limited thereto.

The vibration portion 1311*a* according to an embodiment of the present disclosure may include a plurality of first portions 1311*a*1 and a plurality of second portions 1311*a*2. For example, the plurality of first portions 1311*a*1 and the plurality of second portions 1311*a*2 may be alternately and repeatedly arranged in a first direction X (or a second direction Y). For example, the first direction X may be a widthwise direction of the vibration portion 1311*a* and the second direction Y may be a lengthwise direction of the vibration portion 1311*a* intersecting with the first direction X, but embodiments of the present disclosure are not limited thereto and the first direction X may be a lengthwise direction of the vibration portion 1311*a* and the second direction Y may be a widthwise direction of the vibration portion 1311*a*.

For example, the first portion 1311*a*1 may include an inorganic material, and the second portion 1311*a*2 may include an organic material. For example, the first portion 1311*a*1 may have a piezoelectric material, and the second portion 1311*a*2 may have a ductile characteristic or flexibility. For example, the inorganic material of the first portion 1311*a*1 may have a piezoelectric material, and the organic material of the second portion 1311*a*2 may have a ductile characteristic or flexibility.

Each of the plurality of first portions 1311*a*1 may include an inorganic material portion. The inorganic material portion may include a piezoelectric material, a composite piezoelectric material, or an electro active material, which has a piezoelectric effect.

Each of the plurality of first portions 1311*a*1 may include a ceramic-based material for generating a relatively high vibration, or may include a piezoelectric ceramic having a perovskite-based crystalline structure. The perovskite crystalline structure may have a piezoelectric effect and/or an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "O" may be anions. For example, each of the plurality of first portions **1311*a*1** may include one or more of lead(II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

In a perovskite crystalline structure, a position of a center ion may be changed by an external stress or a magnetic field to vary polarization, and a piezoelectric effect may be generated based on the variation of the polarization. In a perovskite crystalline structure including $PbTiO_3$, a position of a Ti ion corresponding to a center ion may be changed to vary polarization, and thus, a piezoelectric effect may be generated. For example, in the perovskite crystalline structure, a cubic shape having a symmetric structure may be changed to a tetragonal shape, an orthorhombic shape, and a rhombohedral shape each having an unsymmetric structure by an external stress or a magnetic field, and thus, a piezoelectric effect may be generated. Polarization may be high at a morphotropic phase boundary (MPB) of a tetragonal structure and a rhombohedral structure, and polarization may be easily realigned, thereby obtaining a high piezoelectric characteristic.

Each of the plurality of first portions **1311*a*1 may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. According to another embodiment of the present disclosure, each of the plurality of first portions 1311*a*1** may include one or more of calcium titanate ($CaTiO_3$), $BaTiO_3$, and $SrTiO_3$, each without Pb, but embodiments of the present disclosure are not limited thereto.

Each of a plurality of second portions **1311*a*2 according to an embodiment of the present disclosure may include an organic material portion. The organic material portion included in the second portion 1311*a*2 may include an organic material, an organic polymer, an organic piezoelectric material, or an organic non-piezoelectric material having a flexible characteristic compared to the inorganic material portion which is the first portion 1311*a*1. For example, the second portion 1311*a*2 may be referred to as an adhesive portion, a stretch portion, a bending portion, a damping portion, or a flexible portion having flexibility, but embodiments of the present disclosure are not limited thereto. For example, the organic material portion may be disposed between two adjacent inorganic material portions, and thus, may absorb an impact applied to the inorganic material portion (or a first portion) and may release a stress which concentrates on the inorganic material portion, thereby enhancing the durability of the vibration portion 1311*a* or the vibration device 131 and providing flexibility to the vibration portion 1311*a* or the vibration device 131**.

Each of the plurality of second portions **1311*a*2 may be disposed between the plurality of first portions 1311*a*1. Therefore, in the vibration portion 1311*a* or the vibration device 131, vibration energy based on a link in a unit lattice of the first portion 1311*a*1 may be increased by the second portion 1311*a*2, and thus, a vibration characteristic may increase and a piezoelectric characteristic and flexibility may be secured. For example, the second portion 1311*a*2** may include one of an epoxy-based polymer, an acrylic-based polymer, and a silicone-based polymer, but embodiments of the present disclosure are not limited thereto.

The second portion **1311*a*2 according to an embodiment of the present disclosure may have a modulus and viscoelasticity that are lower than those of the first portion 1311*a*1, and thus, the second portion 1311*a*2 may enhance the reliability of the first portion 1311*a*1 vulnerable to an impact due to a fragile characteristic of the first portion 1311*a*1. For example, the second portion 1311*a*2** may include a material having a loss coefficient of about 0.01 to about 1 and a modulus of about 0.1 GPa (GigaPascals) to about 10 GPa.

In the vibration portion **1311*a*, the plurality of first portions 1311*a*1 and the plurality of second portions 1311*a*2 may be disposed (or arranged) in parallel on the same plane (or the same layer). Each of the plurality of second portions 1311*a*2 may be configured to fill a gap between two adjacent first portions 1311*a*1, and thus, each of the plurality of second portions 1311*a*2 may be connected to or attached on an adjacent first portion 1311*a*. Accordingly, the vibration portion 1311*a* may extend by a desired size or length based on lateral coupling (or connection) of the first portion 1311*a*1 and the second portion 1311*a*2**.

Referring to FIG. 7A, a plurality of first portions **1311*a*1 and a plurality of second portions 1311*a*2 may be alternately and repeatedly arranged in a first direction X. Each of the plurality of first portions 1311*a*1 may be disposed between the plurality of second portions 1311*a*2. For example, each of the plurality of first portions 1311*a*1 may have a first width W1 parallel to the first direction X and a length parallel to the second direction Y. Each of the plurality of second portions 1311*a*2 may have a second width W2 parallel to the first direction X and a length parallel to the second direction Y. The first width W1 may be the same as or different from the second width W2. For example, the first width W1 may be greater than the second width W2. For example, the first portion 1311*a*1 and the second portion 1311*a*2 may include a line shape or a stripe shape having the same size or different sizes. Accordingly, the vibration portion 1311*a* illustrated in FIG. 7A may have a 2-2 composite structure and may have a resonance frequency of 20 kHz or less, but embodiments of the present disclosure are not limited thereto. For example, a resonance frequency of the vibration portion 1311*a*** may vary based on one or more of a shape, a length, and a thickness of the vibration portion.

In the vibration portion **1311*a* illustrated in FIG. 7A, the plurality of first portions 1311*a*1 and the plurality of second portions 1311*a*2 may be disposed (or arranged) in parallel on the same plane (or the same layer). Each of the plurality of second portions 1311*a*2 may be configured to fill a gap between two adjacent first portions 1311*a*1, and thus, each of the plurality of second portions 1311*a*2 may be connected to or attached on an adjacent first portion 1311*a*. Accordingly, the vibration portion 1311*a* may extend by a desired size or length based on lateral coupling (or connection) of the first portion 1311*a*1 and the second portion 1311*a*2**.

In the vibration portion **1311*a* illustrated in FIG. 7A, the width W2 and W2 of each of the plurality of second portions 1311*a*2 may decrease progressively in a direction from a center portion of the vibration portion 1311*a*** or the vibration apparatus to both edge portions (or both sides or both ends or both peripheries) thereof.

According to an embodiment of the present disclosure, a second portion **1311*a*2, having a largest width W2 among the plurality of second portions 1311*a*2, may be located at a portion at which a highest stress may concentrate when the vibration portion 1311*a* or the vibration apparatus is vibrating in a vertical direction Z (or a thickness direction). A second portion 1311*a*2, having a smallest width W2 among the plurality of second portions 1311*a*2, may be located at a portion where a relatively low stress may occur when the vibration portion 1311***a* or the vibration apparatus is vibrating in the vertical direction Z. For example, the second portion 1311*a*2, having the largest width W2 among the plurality of second portions 1311*a*2, may be disposed at the center portion of the vibration portion 1311*a*, and the second portion 1311*a*2, having the smallest width W2 among the plurality of second portions 1311*a*2 may be disposed at each of the both peripheries of the vibration portion 1311*a*. Therefore, when the vibration portion 1311*a* or the vibration apparatus is vibrating in the vertical direction Z, interference of a sound wave or overlapping of a resonance frequency, each occurring in the portion on which the highest stress concentrates, may be reduced or minimized. Thus, dipping phenomenon of a sound pressure level occurring in the low-pitched sound band may be reduced, thereby improving flatness of a sound characteristic in the low-pitched sound band. For example, flatness of a sound characteristic may be a level of a deviation between a highest sound pressure level and a lowest sound pressure level.

In the vibration portion 1311*a* illustrated in FIG. 7A, the plurality of first portions 1311*a*1 may have different sizes (or widths). For example, a size (or a width) of each of the plurality of first portions 1311*a*1 may decrease or increase progressively in a direction from the center portion of the vibration portion 1311*a* or the vibration apparatus to both edge portions (or both sides or both ends or both peripheries portions) thereof. Therefore, a sound pressure level characteristic of a sound of the vibration portion 1311*a* may be enhanced by various unique vibration frequencies based on vibrations of the plurality of first portions 1311*a*1 having different sizes, and a reproduction band of a sound may extend.

Each of the plurality of second portions 1311*a*2 may be disposed between the plurality of first portions 1311*a*1. Therefore, in the vibration portion 1311*a* or the vibration device 131, vibration energy based on a link in a unit lattice of the first portion 1311*a*1 may be increased by the second portion 1311*a*2, and thus, a vibration characteristic may increase and a piezoelectric characteristic and flexibility may be secured. For example, the second portion 1311*a*2 may include one of an epoxy-based polymer, an acrylic-based polymer, and a silicone-based polymer, but embodiments of the present disclosure are not limited thereto.

Each of the plurality of second portions 1311*a*2 according to an embodiment of the present disclosure may be configured with an organic material portion. For example, the organic material portion may be disposed between two adjacent inorganic material portions, and thus, may absorb an impact applied to the inorganic material portion (or the first portion) and may release a stress concentrating on the inorganic material portion, thereby enhancing the durability of the vibration portion 1311*a* or the vibration device 131 and realizing the flexibility of the vibration portion 1311*a* or the vibration device 131.

The second portion 1311*a*2 according to an embodiment of the present disclosure may have a modulus and viscoelasticity that are lower than those of the first portion 1311*a*1, and thus, the second portion 1311*a*2 may enhance the reliability of the first portion 1311*a*1 vulnerable to an impact due to a fragile characteristic of the first portion 1311*a*1. For example, the second portion 1311*a*2 may include a material having a loss coefficient of about 0.01 to about 1 and a modulus of about 0.1 GPa to about 10 GPa.

The organic material portion included in the second portion 1311*a*2 may include an organic material, an organic polymer, an organic piezoelectric material, or an organic non-piezoelectric material having a flexible characteristic compared to the inorganic material portion which is the first portion 1311*a*1. For example, the second portion 1311*a*2 may be referred to as an adhesive portion, a flexible portion, a bending portion, a damping portion, or a ductile portion, or the like, but embodiments of the present disclosure are not limited thereto.

The plurality of first portions 1311*a*1 and the plurality of second portions 1311*a*2 may be disposed on (or connected to) the same plane, and thus, the vibration portion 1311*a* according to the present embodiment may have a single thin film form. For example, the vibration portion 1311*a* may have a structure where the plurality of first portions 1311*a*1 are connected to one side thereof. For example, the vibration portion 1311*a* may have a structure where the plurality of first portions 1311*a*1 are connected in all of the vibration portion 1311*a*. For example, the vibration portion 1311*a* may be vibrated in a vertical direction with respect to the display panel or the vibration member by the first portion 1311*a*1 having a vibration characteristic and may be bent in a curved shape by the second portion 1311*a*2 having flexibility. Also, in the vibration portion 1311*a* according to the present embodiment, a size of the first portion 1311*a*1 and a size of the second portion 1311*a*2 may be set based on a piezoelectric characteristic and flexibility needed for the vibration portion 1311*a* or the vibration device 131. For example, in the vibration portion 1311*a* requiring a piezoelectric characteristic rather than flexibility, a size of the first portion 1311*a*1 may be set to be greater than that of the second portion 1311*a*2. In another embodiment of the present disclosure, in the vibration portion 1311*a* requiring flexibility rather than a piezoelectric characteristic, a size of the second portion 1311*a*2 may be set to be greater than that of the first portion 1311*a*1. Accordingly, a size of the vibration portion 1311*a* may be adjusted based on a desired characteristic, and thus, the vibration portion 1311*a* may be easily designed.

Referring to FIG. 7B, a vibration portion 1311*a* according to another embodiment of the present disclosure may include a plurality of first portions 1311*a*1, which are apart from one another in a first direction X and a second direction Y, and a second portion 1311*a*2 disposed between the plurality of first portions 1311*a*1.

The plurality of first portions 1311*a*1 may be arranged apart from one another in each of the first direction X and the second direction Y. For example, the plurality of first portions 1311*a*1 may be arranged in a lattice form to have a hexahedral shape having the same size. Each of the plurality of first portions 1311*a*1 may include substantially the same piezoelectric material as that of the first portion 1311*a*1 described above with reference to FIG. 7A, and thus, like reference numerals refer to like elements and repeated descriptions thereof are omitted.

The second portion 1311*a*2 may be arranged between the plurality of first portions 1311*a*1 in each of the first direction X and the second direction Y. The second portion 1311*a*2 may be configured to fill a gap between two adjacent first portions 1311*a*1 or surround each of the plurality of first portions 1311*a*1, and thus, may be connected or adhered to an adjacent first portion 1311*a*1. According to an embodiment of the present disclosure, a width of the second portion 1311*a*2 disposed between two first portions 1311*a*1 adjacent to each other in the first direction X may be the same as or different from that of the first portion 1311*a*1, and a width of the second portion **1311*a*2 disposed between two first portions 1311*a*1 adjacent to each other in the second direction Y may be the same as or different from that of the first portion 1311*a*1. The second portion 1311*a*2 may include substantially the same piezoelectric material as that of the second portion 1311*a*2** described above with reference to FIG. 7A, and thus, like reference numerals refer to like elements and repeated descriptions thereof are omitted.

As described above, the vibration portion **1311*a* according to another embodiment of the present disclosure may have a 1-3 composite structure having a piezoelectric characteristic of a 1-3 vibration mode, and thus, may have a resonance frequency of 30 MHz or less, but embodiments of the present disclosure are not limited thereto. For example, the resonance frequency of the vibration portion 1311*a*** may vary based on one or more of a shape, a length, and a thickness.

According to another embodiment of the present disclosure, each of the plurality of first portions **1311*a*1 may have a planar structure having a circular shape. For example, each of the plurality of first portions 1311*a*1 may have a circular plate shape, but embodiments of the present disclosure are not limited thereto. For example, each of the plurality of first portions 1311*a*1** may have a dotted shape including an oval shape, a polygonal shape, or a donut shape.

According to another embodiment of the present disclosure, each of the plurality of first portions **1311*a*1 may have a planar structure having a triangular shape. For example, each of the plurality of first portions 1311*a*1 may have a triangular plate shape. According to another embodiment of the present disclosure, each of the plurality of first portions 1311*a*1 may have a planar structure having a triangular shape. For example, each of the plurality of first portions 1311*a*1** may have a triangular plate shape.

Therefore, the plurality of first portions **1311*a*1 and the plurality of second portions 1311*a*2 may be disposed on (or connected to) the same plane, and thus, the vibration portion 1311*a* according to the present embodiment may have a single thin film form. For example, the vibration portion 1311*a* may have a structure where the plurality of first portions 1311*a*1 are connected to one side thereof. For example, the vibration portion 1311*a* may have a structure where the plurality of first portions 1311*a*1 are connected in all of the vibration portion 1311*a*. For example, the vibration portion 1311*a* may be vibrated in a vertical direction with respect to the display panel or the vibration member by the first portion 1311*a*1 having a vibration characteristic and may be bent in a curved shape by the second portion 1311*a*2 having flexibility. Also, in the vibration portion 1311*a* according to the present embodiment, a size of the first portion 1311*a*1 and a size of the second portion 1311*a*2 may be set based on a piezoelectric characteristic and flexibility needed for the vibration portion 1311*a* or the vibration device 131. For example, in the vibration portion 1311*a* requiring a piezoelectric characteristic rather than flexibility, a size of the first portion 1311*a*1 may be set to be greater than that of the second portion 1311*a*2. In another embodiment of the present disclosure, in the vibration portion 1311*a* requiring flexibility rather than a piezoelectric characteristic, a size of the second portion 1311*a*2 may be set to be greater than that of the first portion 1311*a*1. Accordingly, a size of the vibration portion 1311*a* may be adjusted based on a desired characteristic, and thus, the vibration portion 1311*a*** may be easily designed.

Figure 8:
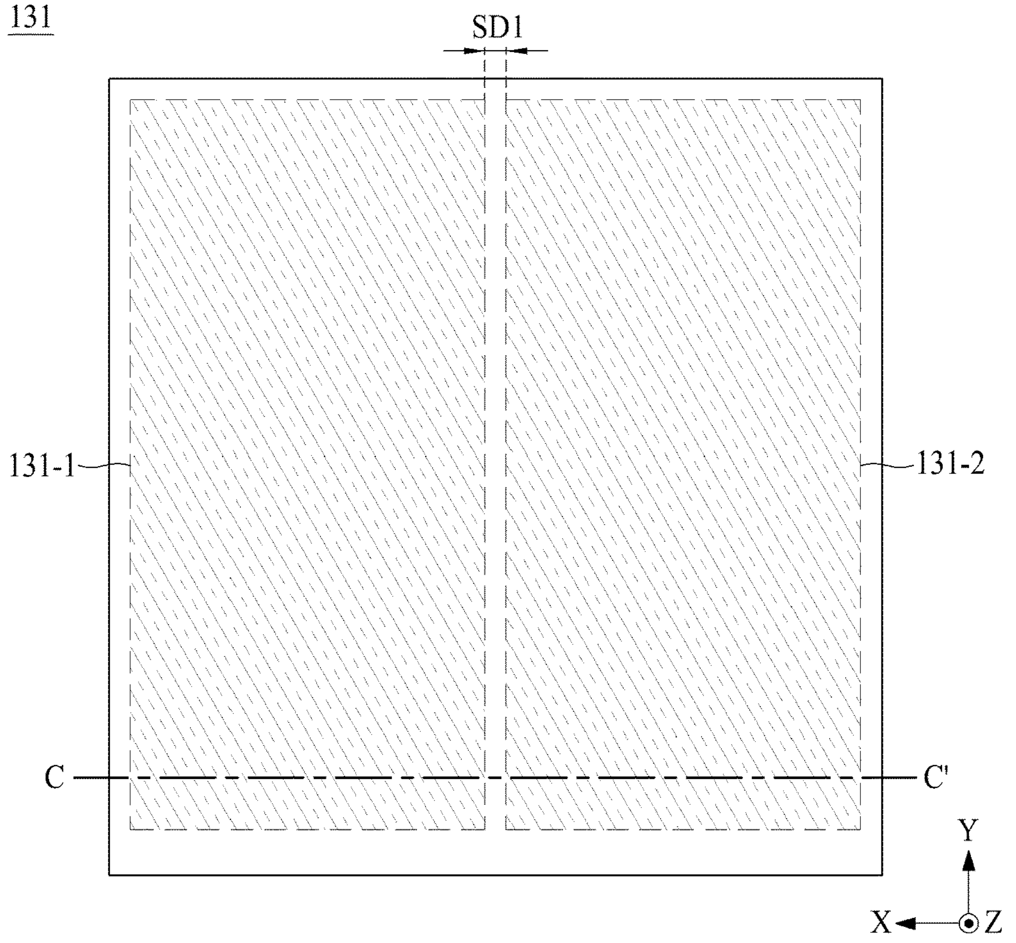
FIG. 8 illustrates a vibration apparatus according to another embodiment of the present disclosure.
Figure 9:
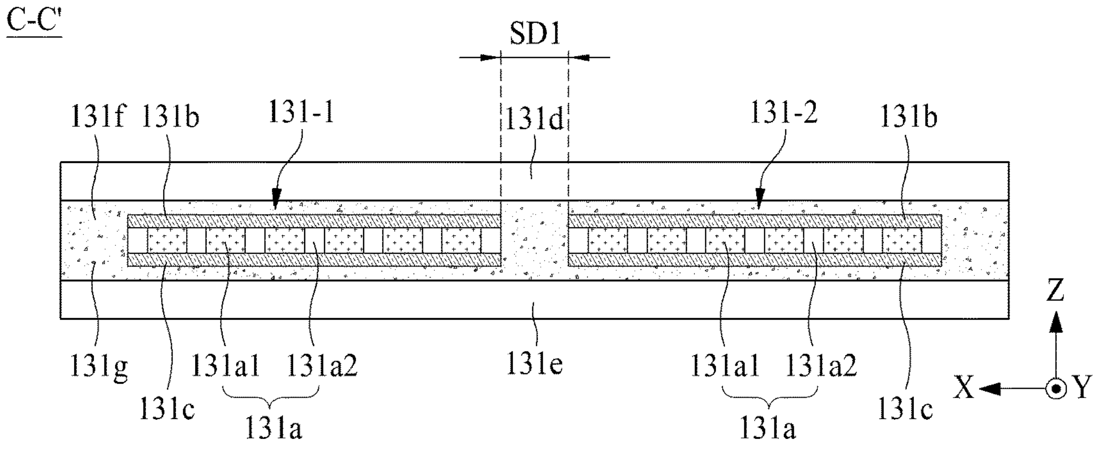
FIG. 9 is a cross-sectional view taken along line C-C' illustrated in FIG. 8.

FIG. 8 illustrates a vibration device according to another embodiment of the present disclosure. FIG. 9 is a cross-sectional view taken along line C-C' illustrated in FIG. 8.

Referring to FIGS. 8 and 9, a vibration apparatus according to another embodiment of the present disclosure may include a first vibration portion 131-1 and a second vibration portion 131-2.

The vibration device 131 or the vibration apparatus according to an embodiment of the present disclosure may be referred to as a flexible vibration structure material, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but the terms are not limited thereto.

The first and second vibration generating portions 131-1 and 131-2 may be electrically disconnected and arranged apart from each other in a first direction X. The first and second vibration generating portions 131-1 and 131-2 may alternately and repeatedly contract and expand based on a piezoelectric effect to vibrate. For example, the first and second vibration generating portions 131-1 and 131-2 may be arranged to have a first separation distance (or interval) SD1.

For example, the first and second vibration generating portions 131-1 and 131-2 may be arranged or tiled at a certain interval SD1 in the first direction X. Therefore, the vibration device 131 where the first and second vibration generating portions 131-1 and 131-2 are tiled may be a vibration array, a vibration array portion, a vibration module array portion, a vibration array structure material, a tiling vibration array, a tiling vibration array module, or a tiling vibration film.

Each of the first and second vibration generating portions 131-1 and 131-2 according to an embodiment of the present disclosure may have a tetragonal shape. For example, each of the first and second vibration generating portions 131-1 and 131-2 may have a tetragonal shape, but embodiments of the present disclosure are not limited thereto. For example, each of the first and second vibration generating portions 131-1 and 131-2 may have a square shape, but embodiments of the present disclosure are not limited thereto.

The first and second vibration generating portions 131-1 and 131-2 may be arranged or tiled on the same plane, and thus, the vibration device 131 may increase in area to have a large area, based on tiling of the first and second vibration generating portions 131-1 and 131-2 having a relatively small size.

The first and second vibration generating portions 131-1 and 131-2 may be disposed or tiled at a certain interval (or distance), and thus, may be implemented as one vibration device (or a single vibration device) which is driven as one complete single body without being independently driven. According to an embodiment of the present disclosure, with respect to the first direction X, an interval or distance SD1 between the first and second vibration generating portions 131-1 and 131-2 may be 0.1 mm or more and smaller than 3 cm, but embodiments of the present disclosure are not limited thereto.

According to an embodiment of the present disclosure, the first and second vibration generating portions 131-1 and 131-2 may be disposed or tiled to have a first separation distance (or interval) SD1 of 0.1 mm or more and smaller than 3 cm, and thus, may be driven as one vibration device. Thereby, a reproduction band and a sound pressure level characteristic of a sound which is generated based on a single vibration of the first and second vibration generating portions 131-1 and 131-2 may be increased. For example, the first and second vibration generating portions 131-1 and 131-2 may be arranged at an interval SD1 of 0.1 mm or more and smaller than 5 mm, in order to increase a reproduction band of a sound generated based on a single vibration of the first and second vibration generating portions 131-1 and 131-2 and to increase a sound of a low-pitched sound band (for example, a sound pressure level characteristic in 500 Hz or less), but embodiments of the present disclosure are not limited thereto.

According to another embodiment of the present disclosure, the first and second vibration generating portions 131-1 and 131-2 may configured as one group, and a plurality of groups may be provided in a vibration member or a display panel.

The first and second vibration generating portions 131-1 and 131-2 according to an embodiment of the present disclosure may each include a vibration portion 1311*a*, a first electrode portion 1311*b*, and a second electrode portion 1311*c*. The vibration portion 1311*a*, the first electrode portion 1311*b*, and the second electrode portion 1311*c* may be substantially the same as the vibration portion 1311*a*, the first electrode portion 1311*b*, and the second electrode portion 1311*c* described above with reference to FIGS. 5 and 6, and thus, like reference numerals refer to like elements and repetitive descriptions thereof are omitted. For example, the vibration portion 1311*a* may configure the vibration device 131 described above with reference to FIGS. 1 to 4B. According to another embodiment, the vibration portion 1311*a* may be configured as the vibration portion 1311*a* of the vibration device 131 described above with reference to FIGS. 5 and 6. According to another embodiment, the vibration portion 1311*a* may be configured as the vibration portion 1311*a* of the vibration device 131 described above with reference to FIGS. 7A and 7B.

The vibration device 131 according to an embodiment of the present disclosure may further include a first cover member 1311*d* and a second cover member 1311*e*.

The first cover member 1311*d* may be disposed at a first surface of the vibration device 131. For example, the first cover member 1311*d* may be disposed at the first electrode portion 1311*b* disposed at a first surface of each of the first and second vibration generating portions 131-1 and 131-2, and thus, may be connected to the first surface of each of the first and second vibration generating portions 131-1 and 131-2 in common or may support the first surface of each of the first and second vibration generating portions 131-1 and 131-2 in common. Therefore, the first cover member 1311*d* may protect the first surface of each of the first and second vibration generating portions 131-1 and 131-2 or the first electrode portion 1311*b*.

The second cover member 1311*e* may be disposed at a second surface of the vibration device 131. For example, the second cover member 1311*e* may be disposed at the second electrode portion 1311*c* disposed at a second surface of each of the first and second vibration generating portions 131-1 and 131-2, and thus, may be connected to the second surface of each of the first and second vibration generating portions 131-1 and 131-2 in common or may support the second surface of each of the first and second vibration generating portions 131-1 and 131-2 in common. Therefore, the second cover member 1311*e* may protect the second surface of each of the first and second vibration generating portions 131-1 and 131-2 or the second electrode portion 1311*c*.

Each of the first cover member 1311*d* and the second cover member 1311*e* according to an embodiment of the present disclosure may include one or more materials of plastic, fiber, and wood, but embodiments of the present disclosure are not limited thereto. For example, the first cover member 1311*d* and the second cover member 1311*e* may include the same material or different materials. For example, the first cover member 1311*d* and the second cover member 1311*e* may be a polyimide film or a polyethylene terephthalate film, but embodiments of the present disclosure are not limited thereto.

The first cover member 1311*d* according to an embodiment of the present disclosure may be disposed at the first surface of each of the first and second vibration generating portions 131-1 and 131-2 by a first adhesive layer 1311*f*. For example, the first cover member 1311*d* may be disposed at the first surface of each of the first and second vibration generating portions 131-1 and 131-2 by a film laminating process using the first adhesive layer 1311*f*. For example, the first cover member 1311*d* may be directly disposed at the first surface of each of the first and second vibration generating portions 131-1 and 131-2 by the film laminating process using the first adhesive layer 1311*f*. Accordingly, the first and second vibration generating portions 131-1 and 131-2 may be provided (or disposed) as one body or tiled at the first cover member 1311*d* to have the certain interval SD1.

The second cover member 1311*e* according to an embodiment of the present disclosure may be disposed at the second surface of each of the first and second vibration generating portions 131-1 and 131-2 by a second adhesive layer 1311*g*. For example, the second cover member 1311*e* may be disposed at the second surface of each of the first and second vibration generating portions 131-1 and 131-2 by a film laminating process using the second adhesive layer 1311*g*. For example, the second cover member 1311*e* may be directly disposed at the second surface of each of the first and second vibration generating portions 131-1 and 131-2 by the film laminating process using the second adhesive layer 1311*g*. Accordingly, the first and second vibration generating portions 131-1 and 131-2 may be provided (or disposed) as one body or tiled at the second cover member 1311*e* to have the certain interval SD1.

The first and second adhesive layers 1311*f* and 1311*g* may be connected or coupled to each other between the first and second vibration generating portions 131-1 and 131-2. Therefore, each of the first and second vibration generating portions 131-1 and 131-2 may be surrounded by the first and second adhesive layers 1311*f* and 1311*g*. For example, the first and second adhesive layers 1311*f* and 1311*g* may be configured between the first cover member 1311*d* and the second cover member 1311*e* to completely surround the first and second vibration generating portions 131-1 and 131-2. For example, each of the first and second vibration generating portions 131-1 and 131-2 may be embedded or built-in between the first adhesive layer 514 and the second adhesive layer 515.

Each of the first and second adhesive layers 1311*f* and 1311*g* according to an embodiment of the present disclosure may include an electric insulating material which has adhesiveness and is capable of compression and decompression. For example, each of the first and second adhesive layers 1311*f* and 1311*g* may include an epoxy resin, an acrylic resin, a silicone resin, or a urethane resin, but embodiments of the present disclosure are not limited thereto. Each of the first and second adhesive layers 1311*f* and 1311*g* may be configured to be transparent, translucent, or opaque. For example, the first and second adhesive layers 1311*f* and 1311*g* may be disposed as one adhesive layer.

Therefore, the vibration apparatus according to an embodiment of the present disclosure may include a vibration apparatus including a plurality of vibration portions 131-1 and 131-2 arranged (or tiled) at a certain interval D1 so that the vibration apparatus is not independently driven and is implemented as one single vibrator, and thus, may be driven as a large-area vibrator based on a single-body vibration of the plurality of vibration portions 131-1 and 131-2. Accordingly, the vibration apparatus may vibrate a total area of the vibration member 100 or the display panel, thereby increasing or enhancing each of a sound characteristic and a sound pressure level characteristic in a low-pitched sound band and a reproduction band of a sound generated based on a vibration of the vibration member 100 or the display panel.

Figure 10:
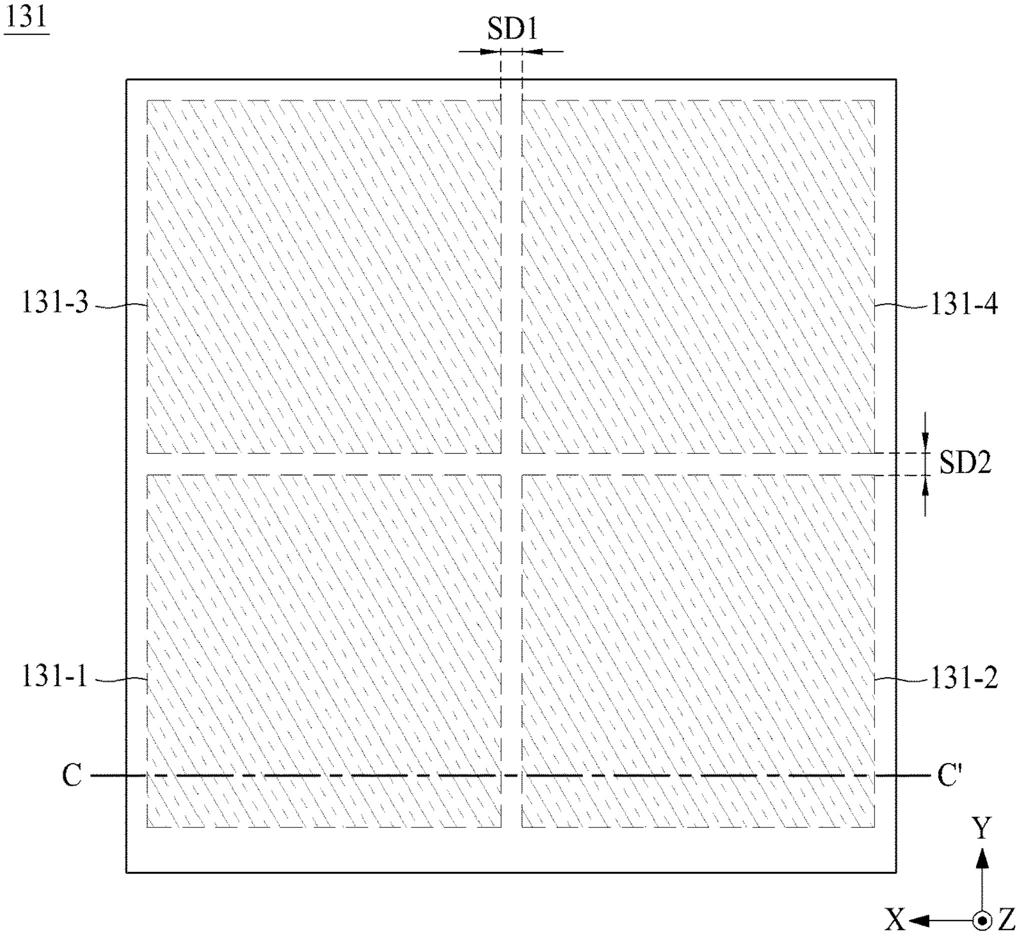
FIG. 10 illustrates a vibration apparatus according to another embodiment of the present disclosure.

FIG. 10 illustrates a vibration device according to another embodiment of the present disclosure. A cross-sectional view taken along line C-C' illustrated in FIG. 10 is illustrated in FIG. 9.

FIG. 10 illustrates an embodiment where four vibration generating portions are provided in the vibration apparatus illustrated in FIG. 8. Hereinafter, therefore, the other elements except four vibration generating portions and relevant elements are referred to by like reference numerals, and their repetitive descriptions are omitted or will be briefly given.

Referring to FIG. 10, a vibration apparatus according to another embodiment of the present disclosure may include a plurality of vibration generating portions 131-1, 131-2, 131-3 and 131-4.

The plurality of vibration generating portions 131-1, 131-2, 131-3 and 131-4 may be electrically disconnected and arranged apart from one another in a first direction X and a second direction Y. For example, the plurality of vibration generating portions 131-1, 131-2, 131-3 and 131-4 may be arranged in an iXj form on the same plane, and thus, the vibration device may increase in area to have a large area, based on the plurality of vibration generating portions 131-1, 131-2, 131-3 and 131-4 having a relatively small size. For example, the plurality of vibration generating portions 131-1, 131-2, 131-3 and 131-4 may be arranged or tiled in an iXj form on the same plane, and thus, the vibration device may increase in area to have a large area, based on tiling of the plurality of vibration generating portions 131-1, 131-2, 131-3 and 131-4 having a relatively small size. For example, i may be the number of vibration generating portions arranged in a first direction X and may be a natural number of 2 or more, and j may be the number of vibration generating portions arranged in a second direction Y and may be a natural number of 2 or more which is equal to or different from i. For example, the plurality of vibration generating portions 131-1, 131-2, 131-3 and 131-4 may be arranged or tiled in a 2×2 form, but embodiments of the present disclosure are not limited thereto. In the following description, an example where a vibration device includes first to fourth vibration generating portions 131-1, 131-2, 131-3 and 131-4 will be described.

According to an embodiment of the present disclosure, first and second vibration generating portions 131-1 and 131-2 may be apart from each other in the first direction X. Third and fourth vibration generating portions 131-3 and 131-4 may be apart from each other in the first direction X and may be apart from the first and second vibration generating portions 131-1 and 131-2 in the second direction Y. The first and third vibration generating portions 131-1 and 131-3 may be apart from each other in the second direction Y to face each other. The second and fourth vibration generating portions 131-2 and 131-4 may be apart from each other in the second direction Y to face each other.

The first to fourth vibration generating portions 131-1, 131-2, 131-3 and 131-4 may be disposed between a first cover member 1311*d* and a second cover member 1311*e*. For example, each of the first cover member 1311*d* and the second cover member 1311*e* may connect or support the first to fourth vibration generating portions 131-1, 131-2, 131-3 and 131-4 in common, and thus, the first to fourth vibration generating portions 131-1, 131-2, 131-3 and 131-4 may be driven as one vibration apparatus (or a single vibration apparatus). For example, the first to fourth vibration generating portions 131-1, 131-2, 131-3 and 131-4 may be arranged or tiled at a certain interval in the first cover member 1311*d* and the second cover member 1311*e*, and thus, may be driven as one vibration apparatus (or a single vibration apparatus). According to another embodiment, the first to fourth vibration generating portions 131-1, 131-2, 131-3 and 131-4 may configure one group, and a plurality of groups may be arranged.

According to another embodiment of the present disclosure, as described above with reference to FIGS. 8 and 9, the first vibration generating portion 131-1 and the third vibration generating portion 131-3 may configure one vibration apparatus, and the second vibration generating portion 131-2 and the fourth vibration generating portion 131-4 may configure one vibration apparatus. For example, the first vibration generating portion 131-1 and the third vibration generating portion 131-3 which are two vibration apparatuses may configure one vibration apparatus (o a first group), and the second vibration generating portion 131-2 and the fourth vibration generating portion 131-4 which are two vibration apparatuses may configure one vibration apparatus (o a second group) and may be disposed in a vibration member or a display panel. For example, three or more vibration apparatuses (a first group or a second group) may be configured.

According to an embodiment of the present disclosure, as described above with reference to FIGS. 8 and 9, the first to fourth vibration generating portions 131-1, 131-2, 131-3 and 131-4 may be arranged (or tiled) at intervals SD1 and SD2 of 0.1 mm or more and less than 3 cm in the first direction X and the second direction Y, or may be arranged or tiled at an interval of 0.1 mm or more and less than 5 mm, for a single-body vibration or a large-area vibration.

Each of the first to fourth vibration generating portions 131-1, 131-2, 131-3 and 131-4 may include a vibration portion 1311*a*, a first electrode portion 1311*b*, and a second electrode portion 1311*c*.

The vibration portion 1311*a* of each of the first to fourth vibration generating portions 131-1, 131-2, 131-3 and 131-4 may include a piezoelectric material (or an electro active material) including a piezoelectric effect. The vibration portion 1311*a* of each of the first to fourth vibration generating portions 131-1, 131-2, 131-3 and 131-4 may be substantially the same as one of the vibration device 131 and/or the vibration portions 1311*a* described above with reference to FIGS. to 6 and 7A to 7B, and thus, like reference numerals refer to like elements and repetitive descriptions thereof are omitted.

According to an embodiment of the present disclosure, each of the first to fourth vibration generating portions 131-1, 131-2, 131-3 and 131-4 may include one vibration portion 1311*a* or different vibration portions 1311*a* among the vibration portions 1311*a* described above with reference to FIGS. 1 to 6 and 7A to 7B.

According to another embodiment of the present disclosure, one or more of the first to fourth vibration generating portions 131-1, 131-2, 131-3 and 131-4 may include different vibration portions 1311*a* among the vibration portions 1311*a* described above with reference to FIGS. 1 to 6 and 7A to 7B.

The first electrode portion 1311*b* may be disposed at a first surface of a corresponding vibration portion 1311*a* and may be electrically connected to the first surface of the vibration portion 1311*a*. This may be substantially the same as the first electrode portion 1311*b* described above with reference to FIGS. 5 and 6, and thus, like reference numerals refer to like elements and repetitive descriptions thereof are omitted.

The second electrode portion 1311*c* may be disposed at a second surface of the vibration portion 1311*a* and may be electrically connected to the second surface of the vibration portion 1311*a*. This may be substantially the same as the first electrode portion 1311*b* described above with reference to FIGS. 5 and 6, and thus, like reference numerals refer to like elements and repetitive descriptions thereof are omitted.

According to an embodiment of the present disclosure, first and second adhesive layers 1311*f* and 1311*g* may be connected or coupled to each other between the first to fourth vibration generating portions 131-1, 131-2, 131-3 and 131-4. Therefore, each of the first to fourth vibration generating portions 131-1, 131-2, 131-3 and 131-4 may be surrounded by the first and second adhesive layers 1311*f* and 1311*g*. For example, the first and second adhesive layers 1311*f* and 1311*g* may be provided between the first cover member 1311*d* and the second cover member 1311*e* to surround each of the first to fourth vibration generating portions 131-1, 131-2, 131-3 and 131-4. For example, the first and second adhesive layers 1311*f* and 1311*g* may be provided between the first cover member 1311*d* and the second cover member 1311*e* to fully surround each of the first to fourth vibration generating portions 131-1, 131-2, 131-3 and 131-4. For example, each of the first to fourth vibration generating portions 131-1, 131-2, 131-3 and 131-4 may be buried or embedded between the first and second adhesive layers 1311*f* and 1311*g*.

Therefore, the vibration apparatus according to an embodiment of the present disclosure may include a vibration apparatus including a plurality of vibration portions 131-1 to 131-4 arranged (or tiled) at certain intervals D1 and D2 so that the vibration apparatus is not independently driven and is implemented as one single vibrator, and thus, may be driven as a large-area vibrator based on a single-body vibration of the plurality of vibration portions 131-1 to 131-4. Accordingly, the vibration apparatus may vibrate a total area of the vibration member 100 or the display panel, thereby increasing or enhancing each of a sound characteristic and a sound pressure level characteristic in a low-pitched sound band and a reproduction band of a sound generated based on a vibration of the vibration member 100 or the display panel.

Figure 11A:
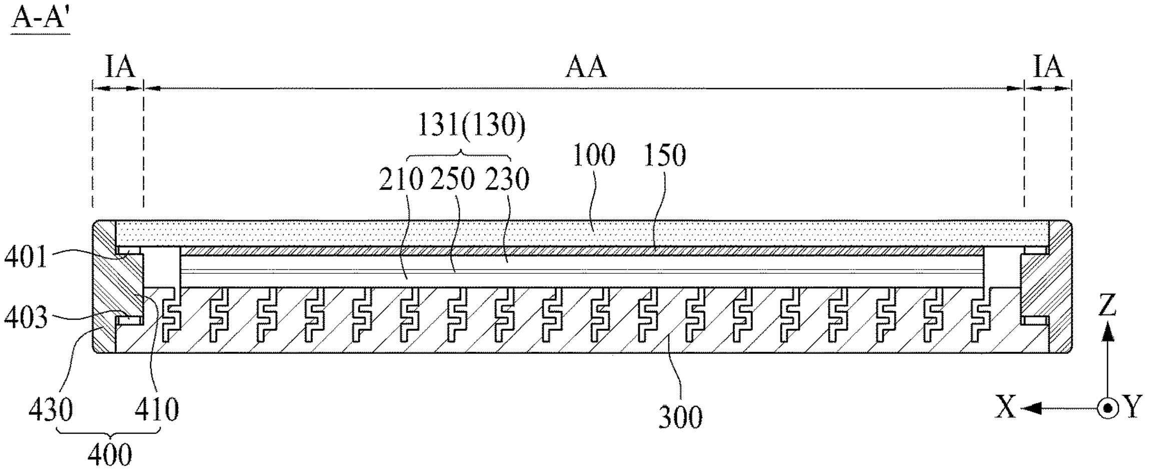
FIG. 11A is another cross-sectional view taken along line A-A' illustrated in FIG. 1.
Figure 11B:
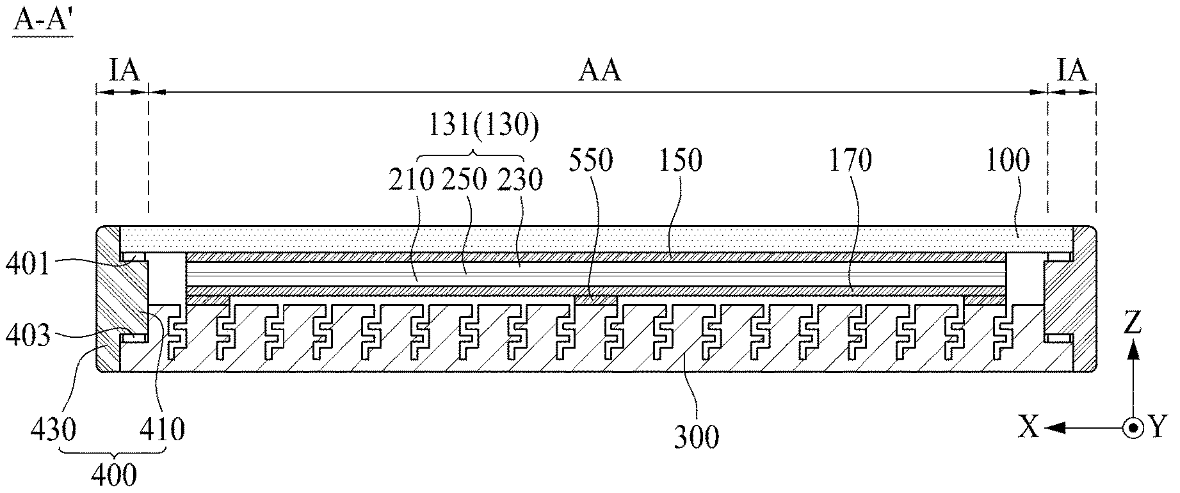
FIG. 11B is another cross-sectional view taken along line A-A' illustrated in FIG. 1.

FIGS. 11A and 11B are diagrams illustrating an apparatus according to another embodiment of the present disclosure. FIGS. 11A and 11B are other cross-sectional views taken along line A-A' illustrated in FIG. 1.

Referring to FIGS. 11A and 11B, a vibration apparatus 130 according to an embodiment of the present disclosure may include a plurality of vibration generators 210 and 230.

A vibration apparatus including one vibration generator may have a problem where it is unable to output a sufficient sound. For example, when a vibration apparatus including one vibration generator is applied to an apparatus such as a television (TV) or the like, there may be a problem where it is difficult to secure a sufficient sound. Therefore, when a vibration apparatus implemented with two vibration generators is applied to an apparatus, an attachment area of the vibration member (or a vibration object) and the vibration apparatus may be enlarged. As the attachment area is enlarged, when the vibrating device is attached to the rear surface of the vibration member 100 (for example, the display panel), it may be difficult to attach the vibration apparatus on the rear surface of the display panel without an air bubble. For example, when the display panel may be a light emitting display panel, there may be a problem where it is difficult to attach the vibration apparatus on an encapsulation substrate without an air bubble. Also, in a vibration apparatus implemented with two vibration generators arranged in parallel, because vibrations of adjacent vibration generators differ, there may be a problem of a division vibration where different vibrations occur. Due to this, there may be a problem where it is difficult to output a sound having enhanced sound flatness. There may be a problem where a division vibration increases as an attachment area of a vibration apparatus increases.

The vibration apparatus 130 according to an embodiment of the present disclosure may include a plurality of vibration generators 210 and 230 which overlap (or stack) each other. The vibration apparatus 130 may include the plurality of vibration generators 210 and 230 which overlap or are stacked to be displaced (or vibrate or drive) in the same direction. For example, the vibration apparatus 130 may include the plurality of vibration generators 210 and 230 which are overlapped or stacked to have the same driving direction.

The plurality of vibration generators 210 and 230 may overlap or be stacked to be displaced (or vibrated or driven) in the same direction. For example, the plurality of vibration generators 210 and 230 may contract or expand in the same driving direction (or displacement direction or vibration direction) based on a vibration driving signal in a state where the plurality of vibration generators 210 and 230 overlap or are stacked, and thus, a displacement amount (or a bending force or a flexural force) or an amplitude displacement of the display panel 100 may increase or may be maximized. Therefore, the plurality of vibration generators 210 and 230 may increase (or maximize) a displacement amount (or a bending force or a flexural force) or an amplitude displacement of the display panel or the vibration member 100, thereby enhancing a sound pressure level characteristic of a sound and a sound characteristic of a middle-low-pitched sound band generated based on a vibration of the display panel 100. For example, the plurality of vibration generators 210 and 230 may be implemented so that the plurality of vibration generators 210 and 230 overlap or are stacked to have the same driving direction, and thus, a driving force of each of the plurality of vibration generators 210 and 230 may increase or may be maximized, thereby enhancing a sound pressure level characteristic of a sound and a sound characteristic of a middle-low-pitched sound band generated by the vibration member 100 based on vibrations of the plurality of vibration generators 210 and 230. For example, the middle-low-pitched sound band may be 200 Hz to 1 kHz, but embodiments of the present disclosure are not limited thereto.

Each of the plurality of vibration generators 210 and 230 may include a vibration portion (or a piezoelectric vibration portion) including piezoelectric ceramic having a piezoelectric characteristic, but embodiments of the present disclosure are not limited thereto. For example, each of the plurality of vibration generators 210 and 230 may include piezoelectric ceramic having a perovskite crystalline structure, and thus, may vibrate (or mechanical displacement) in response to an electrical signal applied from the outside. For example, when a vibration driving signal (or a voice signal) is applied, each of the plurality of vibration generators 210 and 230 may alternately and repeatedly contract and expand based on an inverse piezoelectric effect of the vibration portion (or the piezoelectric vibration portion), and thus, may be displaced (or vibrated or driven) in the same direction based on a bending phenomenon where a bending direction is alternately changed, thereby increasing or maximizing a displacement amount (or a bending force or a flexural force) or an amplitude displacement of the vibration apparatus 130 or/and the vibration member 100 (or display panel).

A first vibration generator 210 disposed in the vibration member 100 among the plurality of vibration generators 210 and 230 may be one main vibration generator. For example, the other second vibration generator 230 of the plurality of vibration generators 210 and 230 may be at least one secondary vibration generator which has the same structure as that of the first vibration generator 210 and is stacked on the first vibration generator 210. The second vibration generator 230 may have the same structure as that of the first vibration generator 210, but embodiments of the present disclosure are not limited thereto. For example, the first vibration generator 210 may be a first vibration film, a first displacement generator, a first displacement film, a first sound generator, a first vibration array, a first vibration array portion, a first vibration structure material array portion, a first vibration array structure material, a first tiling vibration array, a first tiling array module, or a first tiling vibration film, but the terms are not limited thereto. For example, the second vibration generator 230 may be a second vibration film, a second displacement generator, a second displacement film, a second sound generator, a second vibration array, a second vibration array portion, a second vibration structure material array portion, a second vibration array structure material, a second tiling vibration array, a second tiling array module, or a second tiling vibration film, but the terms are not limited thereto.

The vibration apparatus 130 according to an embodiment of the present disclosure may further include an adhesive member 250 (or a second connection member) disposed between the plurality of vibration generators 210 and 230.

The adhesive member 250 according to an embodiment of the present disclosure may be disposed between the plurality of vibration generators 210 and 230. For example, the adhesive member 250 may include a material including an adhesive layer which is good in adhesive force or attaching force with respect to each of the plurality of vibration generators 210 and 230. For example, the adhesive member 250 may include a foam pad, a double-sided tape, or an adhesive, but embodiments of the present disclosure are not limited thereto. For example, the adhesive layer of the adhesive member 250 may include epoxy, acrylic, silicone, or urethane, but embodiments of the present disclosure are not limited thereto. For example, the adhesive layer of the adhesive member 250 may include a urethane-based material which relatively has a ductile characteristic compared to acrylic among acrylic and urethane. Accordingly, the vibration loss of the vibration apparatus 130 caused by displacement interference between the plurality of vibration generators 210 and 230 may be minimized, or each of the plurality of vibration generators 210 and 230 may be freely displaced.

The plurality of vibration generators 210 and 230 according to an embodiment of the present disclosure may be integrated as one structure material (or part) by a laminating process using an adhesive.

The apparatus according to an embodiment of the present disclosure may further include a connection member 150 (or a first connection member) disposed between the display panel 100 and the vibration apparatus 130.

The connection member 150 may be disposed between the display panel or the vibration member 100 and the vibration apparatus 130, and thus, may connect or couple the vibration apparatus 130 to the rear surface of the display panel 100. For example, the vibration apparatus 130 may be connected or coupled to the rear surface of the display panel or the vibration member 100 by the connection member 150, and thus, may be supported by or disposed at the rear surface of the display panel 100.

The connection member 150 according to an embodiment of the present disclosure may include may include a material including an adhesive layer which is good in adhesive force or attaching force with respect to each of the rear surface of the display panel or the vibration member 100 and the vibration apparatus 130. For example, the connection member 150 may include a foam pad, a double-sided tape, or an adhesive, but embodiments of the present disclosure are not limited thereto. For example, the adhesive layer of the connection member 150 may include epoxy, acrylic, silicone, or urethane, but embodiments of the present disclosure are not limited thereto. For example, the adhesive layer of the connection member 150 may differ from the adhesive layer of the adhesive member 250. For example, the adhesive layer of the connection member 150 may include an acrylic-based material which is relatively better in adhesive force and hardness among acrylic and urethane so that the vibration of the vibrating apparatus 130 may be transmitted to the display panel or the vibration member 100 well. Accordingly, a vibration of the vibration apparatus 130 may be transferred to the vibration member 100 well.

The adhesive layer of the connection member 150 may further include an additive, such as a tackifier or an adhesion enhancing agent, a wax component, an anti-oxidation agent, or the like. The additive may prevent or reduce the connection member 150 from being detached (stripped) from the display panel or the vibration member 100 by a vibration of the vibration apparatus 130. For example, the tackifier may be rosin derivative or the like, and the wax component may be paraffin wax or the like. For example, the anti-oxidation agent may be a phenol-based anti-oxidation agent, such as thioester, but embodiments of the present disclosure are not limited thereto.

The connection member 150 according to another example of the present disclosure may further include a hollow portion between the display panel or the vibration member 100 and the vibration apparatus 130. The hollow portion of the connection member 150 may provide an air gap between the display panel or the vibration member 100 and the vibration apparatus 130. Due to the air gap, a sound wave (or a sound pressure) based on a vibration of the vibration apparatus 130 may not be dispersed by the connection member 150, and may concentrate on the display panel or the vibration member 100. Thus, the loss of a vibration caused by the connection member 150 may be minimized, thereby increasing a sound pressure level characteristic of a sound generated based on a vibration of the display panel or the vibration member 100.

The apparatus according to an embodiment of the present disclosure may further include a supporting member 300 and a middle frame 400 disposed at a rear surface of the vibration member 100. A description of a supporting member 300 and a middle frame 400 may be substantially the same as descriptions given above with reference to FIGS. 1 and 2, and thus, their repetitive descriptions may be omitted.

Referring to FIG. 11B, a plate may be additionally provided in the apparatus illustrated in FIG. 11A. The apparatus according to an embodiment of the present disclosure may further include a plate 170. For example, the plate 170 may be disposed between the vibration apparatus 130 and the third connection member 550. The plate 170 may adjust a resonance of a frequency band of the vibration apparatus 130. Therefore, the flatness of a sound pressure level characteristic of the vibration apparatus 130 may be enhanced. For example, the plate 170 may improve a sound of the low-pitched sound band and/or flatness of a sound pressure level characteristic of the vibration apparatus 130 along with the supporting member 300 including the metamaterial, and thus, may more enhance a sound pressure level characteristic and/or a sound characteristic of the vibration apparatus 130. Descriptions of the plate 170 may be the same as details described above with reference to FIG. 4B, and thus, are omitted or will be briefly given below.

Figure 12:
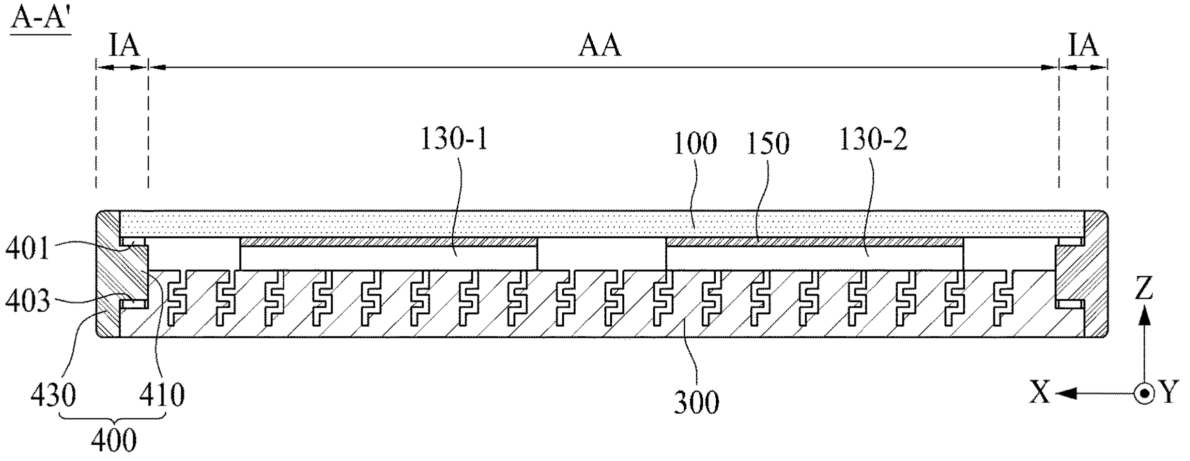
FIG. 12 is another cross-sectional view taken along line A-A' illustrated in FIG. 1.

FIG. 12 is another cross-sectional view taken along line A-A' illustrated in FIG. 1.

With reference to FIG. 12, in the apparatus according to another embodiment of the present disclosure, a vibration member 100 may include a first region and a second region. For example, a rear surface (or a back surface) of the vibration member 100 may include a first region (or a first rear area) and a second region (or a second rear area). For example, in the rear surface of the vibration member 100, the first region may be a left rear region, and the second region may be a right rear region. The first and second regions may be a left-right symmetrical with respect to a center line CL of the vibration member 100 in a first direction X, but embodiments of the present disclosure are not limited thereto. For example, when the vibration member 100 is a display panel, each of the first and second regions may overlap the display area of the display panel.

A vibration apparatus 130 according to another embodiment of the present disclosure may include a first vibration apparatus 130-1 and a second vibration apparatus 130-2, which are disposed at a rear surface of a vibration member 100. For example, the first vibration apparatus 130-1 may be a first vibration generating apparatus, a first vibration apparatus, a first displacement apparatus, a first sound apparatus, or a first sound generating apparatus, but the terms are not limited thereto. For example, the second vibration apparatus 130-2 may be a second vibration generating apparatus, a second vibration apparatus, a second displacement apparatus, a second sound apparatus, or a second sound generating apparatus, but the terms are not limited thereto.

The first vibration apparatus 130-1 may be disposed in the first region of the vibration member 100. For example, the first vibration apparatus 130-1 may be disposed close to a center or a periphery within the first region of the vibration member 100 with respect to the first direction X. The first vibration apparatus 130-1 according to an embodiment of the present disclosure may vibrate the first region of the vibration member 100, and thus, may generate a first vibration sound or a first haptic feedback in the first region of the vibration member 100. For example, the first vibration apparatus 130-1 according to an embodiment of the present disclosure may directly vibrate the first region of the vibration member 100, and thus, may generate the first vibration sound or the first haptic feedback in the first region of the vibration member 100. For example, the first vibration sound may be a left sound. A size of the first vibration apparatus 130-1 according to an embodiment of the present disclosure may have a size corresponding to half or less of the first region or half or more of the first region based on a characteristic of the first vibration sound or a sound characteristic needed for an apparatus. As another embodiment of the present disclosure, the size of the first vibration apparatus 130-1 may have a size corresponding to the first region of the vibration member 100. For example, the size of the first vibration apparatus 130-1 may have the same size as the first area of the vibration member 100 or may have a size smaller than the first area of the vibration member 100.

The second vibration apparatus 130-2 may be disposed in the second region of the vibration member 100. For example, the second vibration apparatus 130-2 may be disposed close to a center or a periphery within the second region of the vibration member 100 with respect to the first direction X. The second vibration apparatus 130-2 according to an embodiment of the present disclosure may vibrate the second region of the vibration member 100, and thus, may generate a second vibration sound or a second haptic feedback in the second region of the vibration member 100. For example, the second vibration apparatus 130-2 according to an embodiment of the present disclosure may directly vibrate the second region of the vibration member 100, and thus, may generate the second vibration sound or the second haptic feedback in the second region of the vibration member 100. For example, the second vibration sound may be a right sound. A size of the second vibration apparatus 130-2 according to an embodiment of the present disclosure may have a size corresponding to half or less of the second region or half or more of the second region based on a characteristic of the second vibration sound or a sound characteristic needed for an apparatus. As another embodiment of the present disclosure, the size of the second vibration apparatus 130-2 may have a size corresponding to the second region of the vibration member 100. For example, the size of the second vibration apparatus 130-2 may have the same size as the second area of the vibration member 100 or may have a size smaller than the second area of the vibration member 100. Therefore, the first vibration apparatus 130-1 and the second vibration apparatus 130-2 may have the same size or different sizes to each other based on a sound characteristic of left and right sounds and/or a sound characteristic of the apparatus. And, the first vibration apparatus 130-1 and the second vibration apparatus 130-2 may be disposed in a left-right symmetrical structure or a left-right asymmetrical structure with respect to the center line CL of the vibration member 100.

Each of the first vibration apparatus 130-1 and the second vibration apparatus 130-2 may include one or more of the vibration apparatuses 130 described above with reference to FIGS. 1 to 11B, and thus, their repeated descriptions are omitted. According to another embodiment of the present disclosure, the plate 170 of FIGS. 4B and 11B may be identically applied to FIG. 12. A description of FIG. 12 may be identically applied to FIGS. 3A and 3B.

The connection member 150 according to an embodiment of the present disclosure may be disposed between each of the first vibration apparatus 130-1 and the second vibration apparatus 130-2 and the rear surface of the vibration member 100. For example, each of the first vibration apparatus 130-1 and the second vibration apparatus 130-2 may be disposed at the rear surface of the vibration member 100 by the connection member 150. The connection member 150 may be substantially the same as the connection member 150 described above with reference to FIG. 2, and thus, their repetitive descriptions may be omitted.

Accordingly, the apparatus according to another embodiment of the present disclosure may output, through the first vibration apparatus 130-1 and the second vibration apparatus 130-2, a left sound and a right sound to a forward region in front of the display panel or the vibration member 100 to provide a sound to a user.

Figure 13:
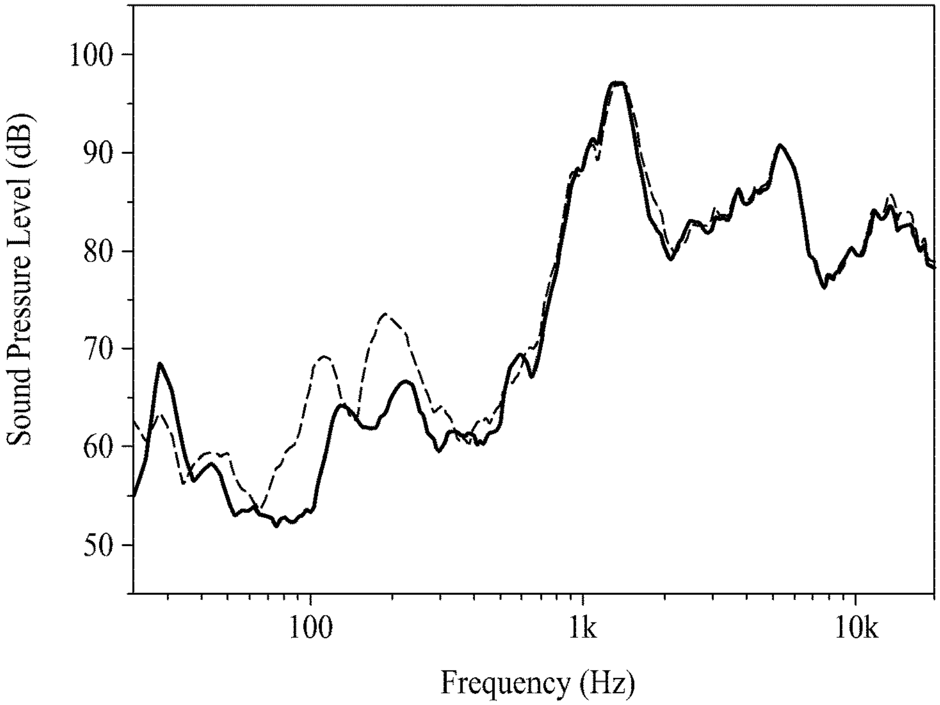
FIG. 13 illustrates a sound output characteristic of an apparatus according to an embodiment of the present disclosure.

FIG. 13 illustrates a sound output characteristic of an apparatus according to another embodiment of the present disclosure.

A sound output characteristic may be measured by a sound analysis apparatus. The sound analysis apparatus may be B&K audio measurement equipment. The sound analysis apparatus may include a sound card which transmits or receives a sound to or from a control personal computer (PC), an amplifier which amplifies a signal generated from the sound card and transfers the amplified signal to a vibration apparatus, and a microphone which collects a sound generated by the vibration apparatus in a display panel. For example, the microphone may be disposed at a center of the vibration apparatus, and a distance between the display panel and the microphone may be about 50 cm. A sound may be measured in a state where the microphone is vertical to the vibration apparatus. The sound collected by the microphone may be input to the control PC through the sound card, and the sound of the vibration apparatus may be analyzed through checking in a control program. For example, a frequency response characteristic of a frequency range of 20 Hz to 20 kHz may be measured by a pulse program.

In FIG. 13, the abscissa axis represents a frequency (Hz (hertz)), and the ordinate axis represents a sound pressure level (SPL) (dB (decibel)). A solid line of FIG. 13 represents a sound output characteristic when a vibration apparatus is attached on a supporting member without an air gap, and a dotted line represents a sound output characteristic of FIG. 2. In FIG. 2, a sound output characteristic has been measured under a condition where a size of a hole is 1 mm, a size of each zigzag coil type is 3 mm, and a vertical length of a zigzag coil type is 10 mm. A size of a metamaterial does not limit details of the present disclosure.

Referring to FIG. 13, comparing with the solid line, in the dotted line, it may be seen that a sound pressure level is enhanced by about 5 dB to 15 dB in a frequency of 100 Hz to 300 Hz. For example, it may be seen that a sound pressure level is enhanced by about 6 dB to 10 dB in a frequency of 80 Hz to 200 Hz. For example, it may be seen that a sound pressure level is enhanced by about 15 dB in a frequency of 100 Hz. According to an embodiment of the present disclosure, because a supporting member including a metamaterial is provided, a vibration apparatus having an enhanced sound characteristic and/or sound pressure level characteristic may be provided. For example, because a supporting member including a metamaterial is provided, a vibration apparatus having an enhanced sound characteristic and/or sound pressure level characteristic of a sound band including a low-pitched sound band may be provided.

Figure 14:
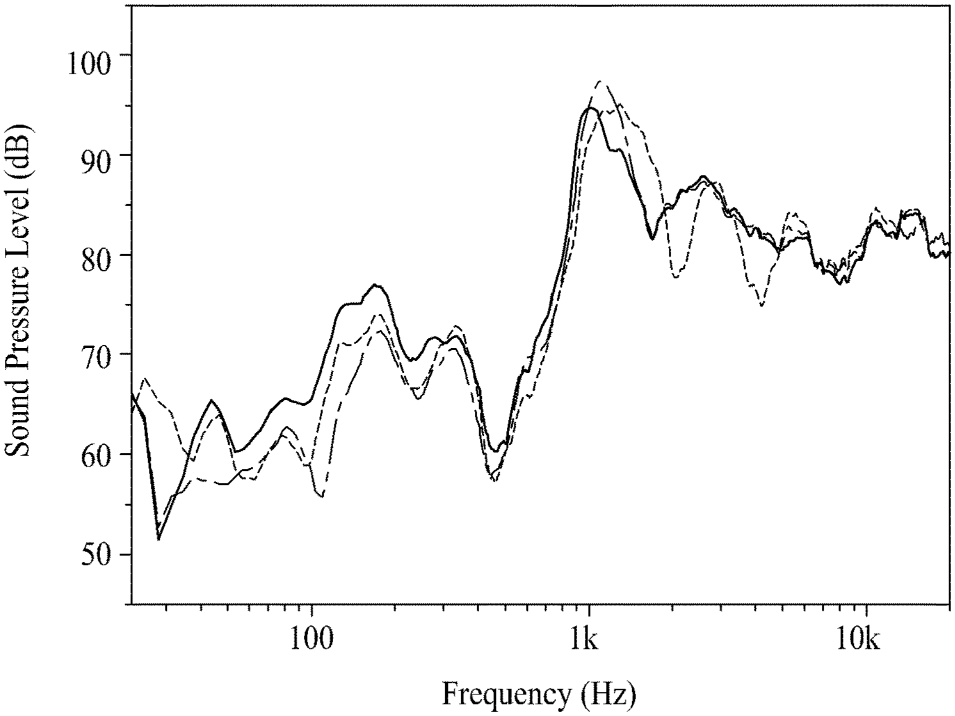
FIG. 14 illustrates a sound output characteristic of an apparatus according to an embodiment of the present disclosure.

FIG. 14 illustrates a sound output characteristic of an apparatus according to an embodiment of the present disclosure.

A measurement method of measuring a sound output characteristic may be the same as details described above with reference to FIG. 13, and thus, its description is omitted.

In FIG. 14, the abscissa axis represents a frequency (Hz), and the ordinate axis represents a sound pressure level (SPL) (dB). A one-dot-dashed line of FIG. 14 represents a sound output characteristic when a vibration apparatus has no air gap between a supporting member and the vibration apparatus, and a dotted line represents a sound output characteristic when the vibration apparatus has an air gap between the supporting member and the vibration apparatus. A solid line represents a sound output characteristic of FIG. 4A. In FIG. 4A, a sound output characteristic has been measured under a condition where a size of a hole is 1 mm, a size of each zigzag coil type is 3 mm, and a vertical length of a zigzag coil type is 10 mm. A size of a metamaterial does not limit details of the present disclosure.

Referring to FIG. 14, comparing with the one-dot-dashed line, in the dotted line corresponding to a case where an air gap is provided, it may be seen that a sound pressure level is enhanced in a frequency of 100 Hz or less. For example, comparing with the one-dot-dashed line corresponding to a case where an air gap is not provided, in the dotted line corresponding to a case where an air gap is provided, a sound pressure level of a low-pitched sound band may be enhanced. Comparing with the one-dot-dashed line corresponding to a case where an air gap is not provided, in the solid line, it may be seen that a sound pressure level is enhanced in a frequency of 100 Hz or less. For example, comparing with the one-dot-dashed line, in the solid line, it may be seen that a sound pressure level is enhanced by about 10 dB or more in a frequency of 100 Hz or less. Comparing with the one-dot-dashed line, in the solid line, it may be seen that a sound pressure level is enhanced in a frequency of 80 Hz to 100 Hz. For example, comparing with the one-dot-dashed line, in the solid line, it may be seen that a sound pressure level is enhanced by about 3 dB to 10 dB or more. Comparing with the one-dot-dashed line, in the solid line, it may be seen that a peak and/or dip in a middle-high-pitched sound band are/is improved. For example, comparing with the one-dot-dashed line, in the solid line, it may be seen that a peak and/or dip in a sound band of 1 kHz or more are/is improved.

Referring to FIG. 14, comparing with the dotted line corresponding to a case where an air gap is provided, in the solid line, it may be seen that a sound pressure level is enhanced in 100 Hz or less. For example, comparing with the dotted line, in the solid line, it may be seen that a sound pressure level is enhanced by about 7 dB in 100 Hz or less. Comparing with the dotted line, in the solid line, it may be seen that a peak and/or dip in a middle-high-pitched sound band are/is improved. For example, comparing with the dotted line, in the solid line, it may be seen that a peak and/or dip in a sound band of 1 kHz or more are/is improved.

For example, comparing with the dotted line and the one-dot-dashed line, in the solid line, it may be seen that a sound pressure level of a low-pitched sound band is enhanced and a peak and/or dip in a middle-high-pitched sound band are/is improved. According to an embodiment of the present disclosure, because a supporting member including a metamaterial is provided and a connection member is provided between the supporting member and a vibration apparatus, a vibration apparatus having an enhanced sound characteristic and/or sound pressure level characteristic may be provided. For example, because a supporting member including a metamaterial is provided and a connection member is provided between the supporting member and a vibration apparatus, a vibration apparatus may be provided where a sound characteristic and/or a sound pressure level characteristic of a sound band including a low-pitched sound band are/is enhanced and a peak and/or dip in a middle-high-pitched sound band are/is improved.

Figure 15:
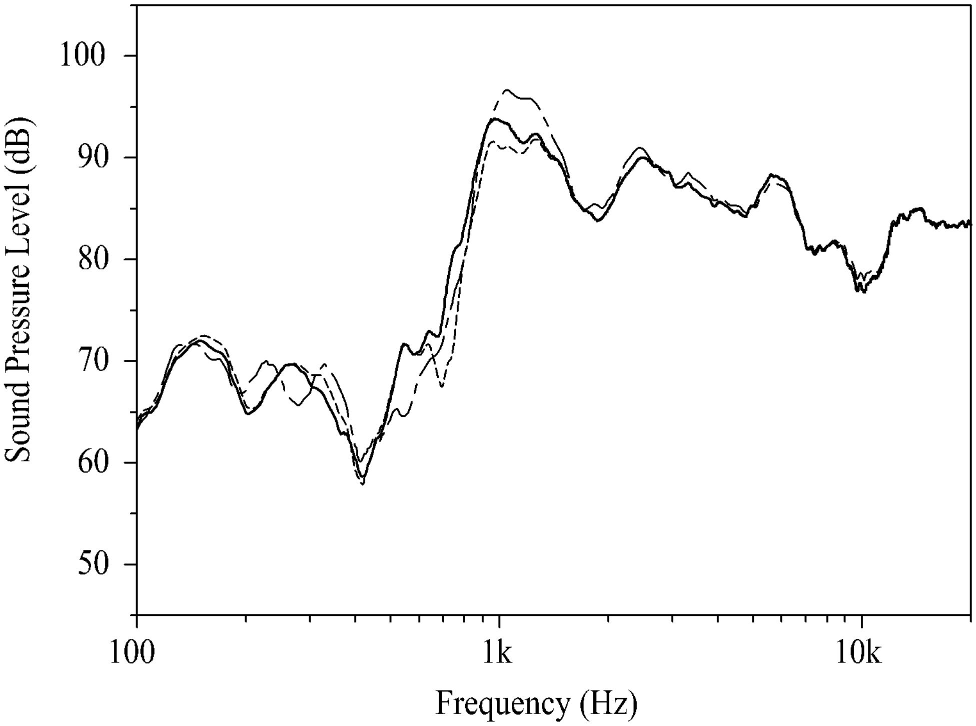
FIG. 15 illustrates a sound output characteristic of an apparatus according to an embodiment of the present disclosure.

FIG. 15 illustrates a sound output characteristic of an apparatus according to an embodiment of the present disclosure.

A measurement method of measuring a sound output characteristic may be the same as details described above with reference to FIG. 13, and thus, its description is omitted.

In FIG. 15, the abscissa axis represents a frequency (Hz (hertz_), and the ordinate axis represents a sound pressure level (SPL) (dB (decibel)). A dotted line of FIG. 15 represents a sound output characteristic of a supporting member including no metamaterial, a solid line represents a sound output characteristic of FIG. 3A, and a one-dot-dashed line represents a sound output characteristic of FIG. 3B. In the solid line and the one-dot-dashed line, a sound output characteristic has been measured under a condition where a depth is 3 mm and a vertical length is 300. A size of a metamaterial does not limit details of the present disclosure.

Referring to FIG. 15, comparing with the dotted line, in the solid line where a metamaterial of a supporting member is configured as a Helmholtz resonance type, it may be seen that a sound pressure level is enhanced in 500 Hz to 1 kHz. For example, comparing with the dotted line, in the solid line, it may be seen that a sound pressure level is enhanced by about 5 dB or more in 500 Hz to 1 kHz. Comparing with the dotted line, in the solid line, it may be seen that a sound pressure level of a middle-high-pitched sound band is enhanced. For example, comparing with the dotted line, in the solid line, it may be seen that a sound pressure level is enhanced by about 3 dB or more in 1 kHz or more.

Comparing with the dot line, in the one-dot-dashed line corresponding to a case where a metamaterial of a supporting member is configured as a pyramid type, it may be seen that a sound pressure level is enhanced in 800 Hz to 1 kHz. For example, comparing with the dot line, in the one-dot-dashed line, it may be seen that a sound pressure level is enhanced by about 7 dB or more in 800 Hz to 1 kHz. Comparing with the dotted line, in the one-dot-dashed line, it may be seen that a sound pressure level of a middle-high-pitched sound band is enhanced. For example, comparing with the dotted line, in the one-dot-dashed line, it may be seen that a sound pressure level is enhanced by about 7 dB or more in 1 kHz or more.

Comparing with the one-dot-dashed line, in the solid line, it may be seen that a sound pressure level is enhanced in 500 Hz to 1 kHz. For example, comparing with the one-dot-dashed line, in the solid line, it may be seen that a sound pressure level is enhanced by about 5 dB or more in 500 Hz to 1 kHz.

Comparing with the one-dot-dashed line, in the solid line corresponding to a case where a metamaterial of a supporting member is configured as the pyramid type, it may be seen that a sound pressure level is enhanced in 800 Hz to 1 kHz. For example, comparing with the dot line and the solid line, in the one-dot-dashed line, it may be seen that a sound pressure level is enhanced by about 5 dB or more in 800 Hz to 1 kHz. Comparing with the one-dot-dashed line, in the solid line, it may be seen that a sound pressure level is enhanced in 500 Hz to 1 kHz. For example, comparing with the one-dot-dashed line, in the solid line, it may be seen that a sound pressure level is enhanced by about 5 dB or more in 500 Hz to 1 kHz. Comparing with the Helmholtz resonance type, in the pyramid type, it may be seen that a sound pressure level of a middle-high-pitched sound band is more enhanced. For example, comparing with the solid line, in the one-dot-dashed line, it may be seen that a sound pressure level is enhanced by about 5 dB or more in 1 kHz or more.

According to an embodiment of the present disclosure, because a supporting member including a metamaterial is provided, a vibration apparatus may be provided where a sound characteristic and/or a sound pressure level characteristic of a sound band including a low-pitched sound band are/is enhanced and a sound characteristic and/or a sound pressure level characteristic of a middle-high-pitched sound band are/is enhanced.

According to an embodiment of the present disclosure, as a depth of a metamaterial increases, a sound characteristic and/or a sound pressure level characteristic of a low-pitched sound band may be more enhanced. Also, when a depth of a metamaterial is about 3 mm, it may be seen that a sound pressure level is improved in a frequency range of about 1 kHz. According to an embodiment of the present disclosure, an interval (or a horizontal length) of a metamaterial may be reduced, and as a density of a metamaterial increases, a sound pressure level characteristic of a low-pitched sound band may be more enhanced.

The vibration apparatus according to an embodiment of the present disclosure may be applied to a vibration apparatus provided in the apparatus. The apparatus according to an embodiment of the present disclosure may be applied to mobile devices, video phones, smart watches, watch phones, wearable devices, foldable devices, rollable devices, bendable devices, flexible devices, curved devices, portable multimedia players (PMPs), personal digital assistants (PDAs), electronic organizers, desktop personal computers (PCs), laptop PCs, netbook computers, workstations, navigation devices, automotive navigation devices, automotive display apparatuses, televisions (TVs), wall paper display apparatuses, signage devices, game machines, notebook computers, monitors, cameras, camcorders, home appliances, etc. Also, the vibration apparatus according to the present disclosure may be applied to organic light emitting lighting devices or inorganic light emitting lighting devices. In a case where the vibration apparatus is applied to a lighting device, the vibration apparatus may act as lighting and a speaker. Also, in a case where the vibration apparatus according to the present disclosure is applied to a mobile device, the vibration apparatus may be one or more of a speaker, a receiver, or a haptic, but embodiments of the present disclosure are not limited thereto.

An apparatus according to various embodiments of the present disclosure will be described below.

An apparatus according to various embodiments of the present disclosure may include a vibration member, a vibration apparatus at a rear surface of the vibration member and configured to vibrate the vibration member, and a supporting member at a rear surface of the vibration apparatus, the supporting member including a metamaterial.

According to various embodiments of the present disclosure, the apparatus may further include a connection member between the rear surface of the vibration apparatus and the supporting member.

According to various embodiments of the present disclosure, the connection member may be disposed in a partial region between the rear surface of the vibration apparatus and the supporting member.

According to various embodiments of the present disclosure, the connection member may be disposed at the rear surface of the vibration apparatus or at a center of the supporting member, and at the rear surface of the vibration apparatus or at both peripheries of the supporting member.

According to various embodiments of the present disclosure, the apparatus may further include a first plate between the vibration apparatus and the connection member.

According to various embodiments of the present disclosure, the first plate may be disposed for adjusting a resonance of a frequency band of the vibration apparatus.

According to various embodiments of the present disclosure, the first plate may comprise a plurality of opening portions.

An apparatus according to various embodiments of the present disclosure may include a vibration member, a vibration apparatus at a rear surface of the vibration member and configured to vibrate the vibration member, a supporting member at a rear surface of the vibration apparatus, the supporting member including a metamaterial, and a connection member at the rear surface of the vibration apparatus and without overlapping a hole of the metamaterial.

According to various embodiments of the present disclosure, the connection member may be between the rear surface of the vibration apparatus and the supporting member.

According to various embodiments of the present disclosure, the apparatus may further include a first plate between the vibration apparatus and the connection member.

According to various embodiments of the present disclosure, the first plate may be disposed for adjusting a resonance of a frequency band of the vibration apparatus.

According to various embodiments of the present disclosure, the metamaterial may contact the vibration apparatus.

According to various embodiments of the present disclosure, the metamaterial may be configured as one or more of a zigzag coil type, a Helmholtz resonance type, and a pyramid type.

According to various embodiments of the present disclosure, the vibration apparatus may include a vibration portion, a first electrode portion on a first surface of the vibration portion, and a second electrode portion on a surface, differing from the first surface, of the vibration portion.

According to various embodiments of the present disclosure, the vibration apparatus may further include a first cover member at the first electrode portion, and a second cover member at the second electrode portion.

According to various embodiments of the present disclosure, the apparatus may further include a first adhesive layer between the first cover member and the first electrode portion, and a second adhesive layer between the second cover member and the second electrode portion.

According to various embodiments of the present disclosure, the vibration portion may include a plurality of inorganic material portions having a piezoelectric characteristic, and an organic material portion between the plurality of inorganic material portions.

According to various embodiments of the present disclosure, the vibration portion may include a piezoelectric material.

According to various embodiments of the present disclosure, the vibration apparatus may include at least two vibration generating portions, and the at least two vibration generating portions may include the vibration portion, the first electrode portion, and the second electrode portion.

According to various embodiments of the present disclosure, the apparatus may further include a second plate between the vibration apparatus and the vibration member.

According to various embodiments of the present disclosure, the vibration member and the second plate may have the same size.

According to various embodiments of the present disclosure, the second plate may comprise a hollow portion provided between the vibration apparatus and the vibration member.

According to various embodiments of the present disclosure, the vibration member may include a first region and a second region, and the vibration apparatus may include a first vibration apparatus disposed in the first region and a second vibration apparatus disposed in the second region.

According to various embodiments of the present disclosure, the vibration apparatus may include two or more vibration generators, and the two or more vibration generators may vibrate in the same direction.

According to various embodiments of the present disclosure, the vibration member may include a metal material, or comprises a single nonmetal or composite nonmetal material including one or more of wood, rubber, plastic, glass, fiber, cloth, paper, and leather.

According to various embodiments of the present disclosure, the vibration member may include one or more of a display panel including a plurality of pixels configured to display an image, a light emitting diode lighting panel, an organic light emitting diode lighting panel, and an inorganic light emitting diode lighting panel.

According to various embodiments of the present disclosure, the vibration member may include one or more of a display panel including a pixel configured to display an image, a screen panel on which an image is to be projected from a display apparatus, a lighting panel, a signage panel, a vehicular interior material, a vehicular window, a vehicular exterior material, a ceiling material of a building, an interior material of a building, a window of a building, an interior material of an aircraft, a window of an aircraft, metal, wood, rubber, plastic, glass, fiber, cloth, paper, leather, and mirror.

A display apparatus according to various embodiments of the present disclosure may include a display panel, a vibration apparatus at a rear surface of the display panel and configured to vibrate the display panel, and a supporting member at a rear surface of the vibration apparatus, the supporting member including a metamaterial.

A display apparatus according to various embodiments of the present disclosure may include a display panel, a vibration apparatus at a rear surface of the display panel and configured to vibrate the display panel, a supporting member at a rear surface of the vibration apparatus, the supporting member including a metamaterial, and a connection member at the rear surface of the vibration apparatus and without overlapping a hole of the metamaterial.

In an apparatus according to the embodiments of the present disclosure, because a vibration apparatus configured to vibrate a display panel or a vibration member is provided, a sound may be generated so that the sound travels toward a front surface of the display panel or the vibration member.

Because the apparatus according to the embodiments of the present disclosure includes a supporting member including a metamaterial, an apparatus for enhancing a sound characteristic and/or a sound pressure level characteristic of a sound band including a low-pitched sound band may be provided.

Because the apparatus according to the embodiments of the present disclosure includes a plate and a supporting member including a metamaterial, an apparatus may be provided where a sound characteristic and/or a sound pressure level characteristic of a sound band including the low-pitched sound band are/is enhanced and the flatness of a sound pressure level characteristic is improved.

Because the apparatus according to the embodiments of the present disclosure includes a supporting member including a metamaterial and a connection member between a vibration apparatus and the supporting member, an apparatus for enhancing a sound characteristic and/or a sound pressure level characteristic of a sound band including the low-pitched sound band may be provided.

It will be apparent to those skilled in the art that various modifications and variations can be made in the apparatus of the present disclosure without departing from the scope of the disclosure. Thus, it is intended that the present disclosure cover the modifications and variations of this disclosure provided they come within the scope of the appended claims and their equivalents.

What is claimed is:

1. An apparatus, comprising:

a vibration member;

a vibration apparatus at a rear surface of the vibration member and configured to vibrate the vibration member; and a supporting member at a rear surface of the vibration apparatus, the supporting member including a metamaterial.

2. The apparatus of claim 1, further comprising a connection member between the rear surface of the vibration apparatus and the supporting member.

3. The apparatus of claim 2, wherein the connection member is disposed in a partial region between the rear surface of the vibration apparatus and the supporting member.

4. The apparatus of claim 2, wherein the connection member is disposed at the rear surface of the vibration apparatus or at a center of the supporting member, and at the rear surface of the vibration apparatus or at both peripheries of the supporting member.

5. The apparatus of claim 2, further comprising a first plate between the vibration apparatus and the connection member.

6. The apparatus of claim 5, wherein the first plate is disposed for adjusting a resonance of a frequency band of the vibration apparatus.

7. The apparatus of claim 6, wherein the connection member is between the rear surface of the vibration apparatus and the supporting member.

8. The apparatus of claim 6, further comprising a first plate between the vibration apparatus and the connection member.

9. The apparatus of claim 1, wherein the metamaterial contacts the vibration apparatus.

10. The apparatus of claim 1, wherein the metamaterial is configured as one or more of a zigzag coil type, a Helmholtz resonance type, and a pyramid type.

11. The apparatus of claim 1, wherein the vibration apparatus comprises:

a vibration portion;

a first electrode portion on a first surface of the vibration portion; and a second electrode portion on a surface differing from the first surface of the vibration portion.

12. The apparatus of claim 11, wherein the vibration apparatus further comprises:

a first cover member at the first electrode portion; and a second cover member at the second electrode portion.

13. The apparatus of claim 12, further comprising:

a first adhesive layer between the first cover member and the first electrode portion; and a second adhesive layer between the second cover member and the second electrode portion.

14. The apparatus of claim 11, wherein the vibration portion comprises:

a plurality of inorganic material portions having a piezoelectric characteristic; and an organic material portion between the plurality of inorganic material portions.

15. The apparatus of claim 11, wherein the vibration portion comprises a piezoelectric material.

16. The apparatus of claim 11, wherein the vibration apparatus comprises at least two vibration generating portions, and the at least two vibration generating portions comprise the vibration portion, the first electrode portion, and the second electrode portion.

17. The apparatus of claim 1, further comprising a second plate between the vibration apparatus and the vibration member.

18. The apparatus of claim 17, wherein the vibration member and the second plate have the same size.

19. The apparatus of claim 17, wherein the second plate comprises a hollow portion provided between the vibration apparatus and the vibration member.

20. The apparatus of claim 1, wherein the vibration member comprises a first region and a second region, and the vibration apparatus comprises a first vibration apparatus at the first region and a second vibration apparatus at the second region.

21. The apparatus of claim 1, wherein the vibration apparatus comprises two or more vibration generators, and the two or more vibration generators vibrate in the same direction.

22. The apparatus of claim 1, wherein the vibration member comprises a metal material, or comprises a single nonmetal or composite nonmetal material including one or more of wood, rubber, plastic, glass, fiber, cloth, paper, and leather.

23. The apparatus of claim 1, wherein the vibration member comprises one or more of a display panel including a plurality of pixels configured to display an image, a light emitting diode lighting panel, an organic light emitting diode lighting panel, and an inorganic light emitting diode lighting panel.

24. The apparatus of claim 1, wherein the vibration member comprises one or more of a display panel including a pixel configured to display an image, a screen panel on which an image is to be projected from a display apparatus, a lighting panel, a signage panel, a vehicular interior material, a vehicular window, a vehicular exterior material, a ceiling material of a building, an interior material of a building, a window of a building, an interior material of an aircraft, a window of an aircraft, metal, wood, rubber, plastic, glass, fiber, cloth, paper, leather, and mirror.

25. An apparatus, comprising:

a vibration member;

a vibration apparatus at a rear surface of the vibration member and configured to vibrate the vibration member;

a supporting member at a rear surface of the vibration apparatus, the supporting member including a metamaterial; and a connection member at the rear surface of the vibration apparatus and without overlapping a hole of the metamaterial.

* * * * *